United States Patent
Shum et al.

(10) Patent No.: US 6,639,596 B1
(45) Date of Patent: Oct. 28, 2003

(54) STEREO RECONSTRUCTION FROM MULTIPERSPECTIVE PANORAMAS

(75) Inventors: Heung-Yeung Shum, Bellevue, WA (US); Richard S. Szeliski, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/399,426

(22) Filed: Sep. 20, 1999

(51) Int. Cl.[7] .............................................. G06T 15/00

(52) U.S. Cl. ...................................................... 345/427

(58) Field of Search .............................. 345/629, 635, 345/636, 420, 419, 427, 619, 625, 627

(56) References Cited

PUBLICATIONS

S. Baker, R. Szeliski, and P. Anandan. A layered approach to stereo reconstruction. In IEEE Computer Society Conference on Computer Vision and Pattern Recognition (CVPR'98), pp. 434–441, Santa Barbara, Jun. 1998.

J. R. Bergen, P. Anandan, K. J. Hanna, and R. Hingorani. Hierarchical model–based motion estimation. In Second European Conference on Computer Vision (ECCV'92), pp. 237–252, Santa Margherita Liguere, Italy, May 1992. Springer–Verlag.

R. T. Collins. A space–sweep approach to true multi–image matching. In IEEE Computer Society Conference on Computer Vision and Pattern Recognition (CVPR'96), pp. 358–363, San Francisco, California, Jun. 1996.

S. J. Gortler, R. Grzeszczuk, R. Szeliski, and M. F. Cohen. The lumigraph. In Computer Graphics Proceedings. Annual Conference Series, pp. 43–54, Proc. SIGGRAPH'96 (New Orleans), Aug. 1996. ACM SIGGRAPH.

R. Gupta and R. I. Hartley. Linear pushbroom cameras. IEEE Transactions on Pattern Analysis and Machine Intelligence,19(9):963–975, Sep. 1997.

(List continued on next page.)

*Primary Examiner*—Phu K. Nguyen
(74) *Attorney, Agent, or Firm*—Lyon & Harr, LLP; Richard T. Lyon

(57) ABSTRACT

A system and process for computing a 3D reconstruction of a scene using multiperspective panoramas. The reconstruction can be generated using a cylindrical sweeping approach, or under some conditions, traditional stereo matching algorithms. The cylindrical sweeping process involves projecting each pixel of the multiperspective panoramas onto each of a series of cylindrical surfaces of progressively increasing radii. For each pixel location on each cylindrical surface, a fitness metric is computed for all the pixels projected thereon to provide an indication of how closely a prescribed characteristic of the projected pixels matches. Then, for each respective group of corresponding pixel locations of the cylindrical surfaces, it is determined which location has a fitness metric that indicates the prescribed characteristic of the projected pixels matches more closely than the rest. For each of these winning pixel locations, its panoramic coordinates are designated as the position of the portion of the scene depicted by the pixels projected to that location. Additionally, in some cases a sufficiently horizontal epipolar geometry exists between multiperspective panoramas such that traditional stereo matching algorithms can be employed for the reconstruction. A symmetric pair of multiperspectives panoramas produces the horizontal epipolar geometry. In addition, this geometry is obtained if the distance from the center of rotation to the viewpoints used to capture the images employed to construct the panorama is small in comparison to the distance from the center of rotation to the nearest scene point depicted in the images, or if an off-axis angle is kept small.

61 Claims, 13 Drawing Sheets

(2 of 13 Drawing Sheet(s) Filed in Color)

OTHER PUBLICATIONS

T. Kanade et al. A stereo machine for video–rate dense depth mapping and its new applications. In IEEE Computer Society Conference on Computer Vision and Pattern Recognition (CVPR'96), pp. 196–202, San Francisco, California, Jun. 1996.

S. B. Kang and R Szeliski, 3–D scene data recovery using omni–directional multibaseline stereo. International Journal of Computer Vision, 25(2):167–183, Nov. 1997.

A. Krishnan and N. Ahuja. Range estimation from focus using a non–frontal imaging camera. International Journal of Computer Vision, 20(3):169–185, Mar./Apr. 1996.

K. N. Kutulakos and S. M. Seitz. A theory of shape by space carving. CS Technical Report 692, University opf Rochester, Rochester, NY, May 1998.

M. Levoy and P. Hanrahan. Light field rendering. In Computer Graphics Proceedings, Annual Conference Series, pp. 31–42, Proc. SIGGRAPH'96 (New Orleans), Aug. 1996. ACM SIG–GRAPH.

L. McMillan and G. Bishop. Plenoptic modeling: An image–based rendering system. Computer Graphics (SIG-GRAPH'95),pp. 39–46, Aug. 1995.

M. Okutomi and T. Kanade. A multiple baseline stereo. IEEE Transactions on Pattern Analysis and Machine Intelligence, 15(4):353–363, Apr. 1993.

R. Peleg and M. Ben–Erza. Stereo panorama with a single camera. In CVPR'99, pp. 395–401, Fort Collins, Jun. 1999.

S. Peleg and J. Herman. Panoramic mosaics by manifold projection. in IEEE Computer Society Conferenc on Computer Vision and Pattern Recognition (CVPR'97), pp. 338–343, San Juan, Puerto Rico, Jun. 1997.

L. H. Quam. Hierarchical warp stereo. In Image Understanding Workshop, pp. 149–155, New Orleans, Louisiana, Dec. 1984. Science Applications International Corporation.

P. Rademacher and Bishop G. Multiple–center–of–projection images. In Computer Graphics Proceedings Annual Conference Series, pp. 199–206, Proc. SIGGRAPH'98 (Orlando), Jul. 1998. ACMSIGGRAPH.

D. Scharstein and R. Szelski. Stereo matching with non–linear diffusion. International Journal of Computer Vision 28(2):155–174, Jul. 1998.

S. M. Seitz and C. M. Dyer. Photorealistic scene reconstruction by space coloring. In IEEE Computer Society Conference on Computer Vision and Pattern Recognition (CVPR'97), pp. 1067–1073,San Juan, Puerto Rico, Jun. 1997.

H.–Y. Shum et al. Omnivergent stereo. In Seventh International Conference on Computer Vision (ICV'99), Greece, Sep. 1999.

H.–Y. Shum and L.–W. He. Rendereing with concentric mosaics. In SIGGRAPH'99, Los Angeles, Aug. 1997.

R. Szeliski. A multi–view approach to motion and stereo. In IEEE Comp. Soc. Conf. On Computer Vision and Pattern Recognition (CVPR'99), pp. 157–163, Fort Collins, Jun. 1999.

R. Szeliski and P. Golland. Stereo matching with transparency and matting. In Sixth International Conferenc on Computer Vision(ICCV'98), pp. 517–524, Bombay, Jan. 1998.

R. Szeliski and H.–Yun Shum. Creating full view panoramic image mosaics and texture–mapped models. Computer Graphics (SIGGTAPH'97), pp. 251–258, Aug. 1997.

D. N. Wood et al. Multiperspective panoramas for cel animaton. In Computer Graphics Proceedings, Annual Conference Series, pp. 243–250, Proc. SIGGRAPH'97 (Los Angeles), Aug. 1997. ACM SIGGRAPH.

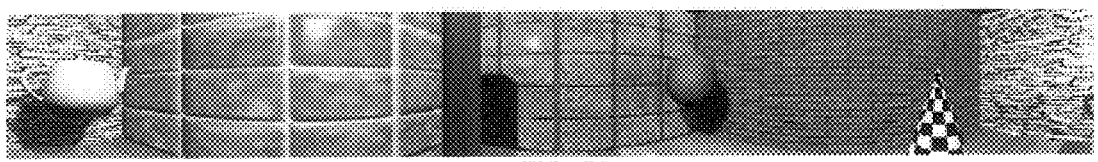
FIG. 5A
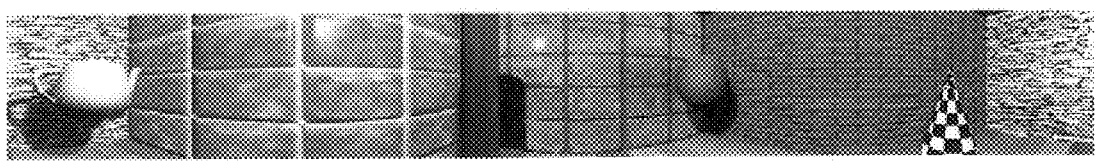
FIG. 5B
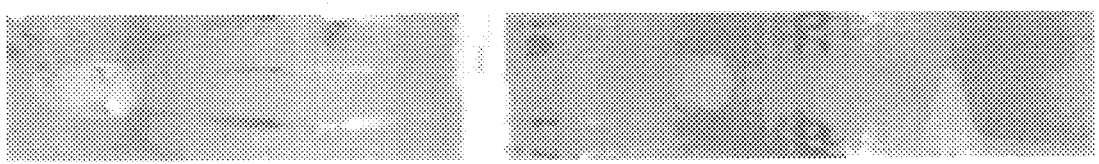
FIG. 5C
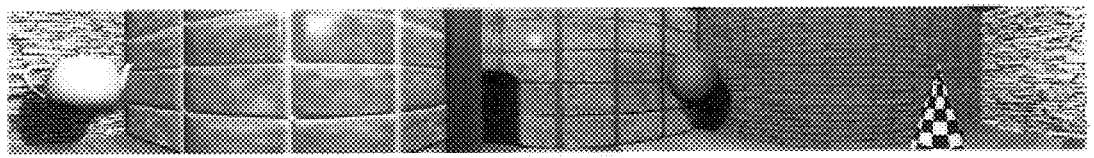
FIG. 5D
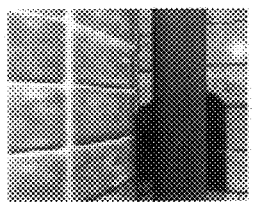    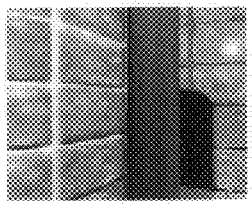    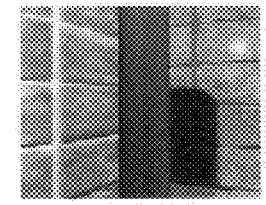    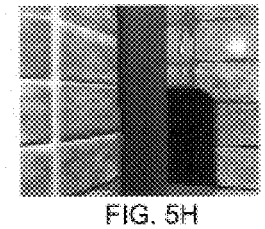
FIG. 5E          FIG. 5F          FIG. 5G          FIG. 5H

FG. 10C

STEREO RECONSTRUCTION FROM MULTIPERSPECTIVE PANORAMAS

BACKGROUND

1. Technical Field

The invention is related to stereo reconstruction approaches, and more particularly to a system and process for computing a dense 3D reconstruction associated with a panoramic view of a surrounding scene using multiperspective panoramas derived from a collection of single-perspective images.

2. Background Art

Traditional stereo reconstruction begins with two calibrated perspective images taken with pinhole cameras. To reconstruct the 3D position of a point in the first image, its corresponding point in the second image has to be found before applying triangulation. Perspective cameras have the property that corresponding points lie on straight lines, which are called epipolar lines. In order to simplify the search for correspondences, the two images can optionally be rectified so that epipolar lines become horizontal.

Recently, there has been a lot of work on 3D reconstruction from large collections of images. Multi-baseline stereo using several images can produce better depth maps by averaging out noise and reducing ambiguities [12]. Space sweeping approaches, which project multiple images onto a series of imaging surfaces (usually planes), also use significant data redundancy for better reconstruction [3, 18, 22, 9].

Consider the problem of building a 3D environment model from thousands of images captured on video. Many modeling approaches to date have concentrated on coarse reconstruction using structure from motion with a small number (typically hundreds) of tracked feature points. What is really desired, however, are truly photorealistic reconstructions, and these require dense 3D reconstruction. One attempt at generating dense 3D reconstructions involved computing a depth map for each input image [21]. However, this method is computationally expensive. Granted, the expense could be lowered by sub-sampling the input frames (e.g., by simply dropping neighboring frames). However, this risks not having enough overlapping frames to build good correspondences for accurate 3D reconstruction.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [3, 18, 22, 9]. A listing of the publications corresponding to each designator can be found at the end of the Detailed Description section.

SUMMARY

The present invention involves a new approach to computing a 3D reconstruction of a scene and associated depth maps from two or more multiperspective panoramas. These reconstructions can be used in a variety of ways. For example, they can be used to support a "look around and move a little" viewing scenario or to extrapolate novel views from original panoramas and a recovered depth map.

The key to this new approach is the construction and use of multiperspective panoramas that efficiently capture the parallax available in the scene. Each multiperspective panorama is essentially constructed by constraining camera motion to a radial path around a fixed rotation center and taking a single perspective image of the scene at a series of consecutive rotation angles around the center of rotation. A particular columnar portion of each of the single-perspective images captured at each consecutive rotation angle is then rebinned to form the multiperspective panorama. This columnar portion of the single-perspective image can be of any width, however, it is preferred that it is one pixel column wide. The column may also have any available height desired, but it is preferred the height correspond to the vertical field of view of the associated single-perspective image. Note that each of these columns would have been captured at a different viewpoint, thus the name "multiperspective" panorama. In addition, it is important to note that the aforementioned "particular" column selected from each of the single-perspective images to form the multiperspective panorama refers to the fact that each of the selected columns must have been captured at the same angle relative to the camera lens.

Single-perspective images having the attributes discussed above are preferably captured in one of two ways. In a first technique, slit cameras (or "regular" perspective cameras where only the center "column" is used) are mounted on a rotating bar at various radial distances from the center of rotation. The cameras are directed so as to face perpendicular to the bar, and so tangent to the circle formed by the camera when the bar is rotated. Each slit image is captured at a different angle of rotation with respect to the rotation center, and each radial position on the bar is used to capture images that will be used to construct a separate multiperspective panorama. It is noted that a single camera could also be employed and repositioned at a different radial position prior to each complete rotation of the bar. As the images captured by this method are all concentric, the multiperspective panoramas constructed are referred to as concentric panoramas or mosaics.

The other preferred technique for capturing the desired single-perspective images employs a "regular" perspective camera mounted on a rotating bar or table looking outwards. Here again, each image is captured at a different angle of rotation with respect to the rotation center. However, in this case, the images are captured at the same radial distance from the center of rotation, and each image column having the same off-axis angle from each image is used to construct a different one of the multiperspective panoramas. The off-axis angle is the angle formed between a line extending from the viewpoint of a column towards the lateral centerline of the portion of the scene depicted by the column and a swing line defined by the center of rotation and the viewpoint. For example, the $20^{th}$ image column taken from each image may be used to form a particular multiperspective panorama. This type of multiperspective panorama has been dubbed a swing panorama.

Multiperspective panoramas make it simple to compute 3D reconstructions associated with a panoramic image of the scene. Specifically, these reconstructions can be generated using a novel cylindrical sweeping approach, or if conditions are right, traditional stereo matching algorithms.

The cylindrical sweep process involves first projecting each pixel of the multiperspective panoramas being used to compute the depth map onto each of a series of cylindrical surfaces of progressively increasing radii. The radius of each of these cylindrical surfaces also exceeds the radius of the outermost multiperspective panorama employed in the process. It is noted that the change in the radius for each consecutive cylindrical surface should be made as small as possible, in light of computational limitations, so as to maximize the precision of the resulting reconstruction. The projection of the pixels of each multiperspective panorama onto a particular cylindrical surface simply consists of a horizontal translation and a vertical scaling. Next, for each pixel location on each cylindrical surface, a fitness metric is computed for all the pixels projected from each multiperspective panorama onto the pixel location. This fitness metric provides an indication as to how closely a prescribed characteristic of the projected pixels match each other. Then, for each respective group of corresponding pixel locations of the cylindrical surfaces, it is determined which particular location of the group has a computed fitness metric that indicates the prescribed characteristic of the projected pixels matches more closely than the rest. This will be referred to as the winning pixel location. Specifically, the winning pixel location can be determined using any appropriate correlation-based or global optimization technique. If correlation-based methods are employed, it is preferred that this entail spatially aggregating the computed fitness metric of each pixel location on each respective cylindrical surface using the computed metrics of its neighboring pixel locations.

The theory behind this cylindrical sweep approach is that the pixels in each multiperspective panorama, which depict the same portion of the scene, will converge to the same location on one of the candidate cylindrical surfaces at the depth associated with that portion of the scene. For each winning pixel location, its panoramic coordinates are identified and these coordinates are designated to be the position of the portion of the scene depicted by the pixels projected from the multiperspective panoramas to that location. Finally, a depth map can be generated via conventional methods from the panoramic coordinates. It is also noted that if the cylinders are processed in front to back order, occlusion relationships can also be determined via conventional methods.

It was mentioned earlier that if conditions are right, traditional stereo matching algorithms can also be employed to compute the desired depth map. One example of the right conditions involves the use a pair of symmetric multiperspective panoramas. A symmetric pair of multiperspective panoramas in the case of swing panoramas is one where the off-axis angles are symmetric with respect to the swing line. In the case of concentric panoramas, a symmetric pair is one where each panorama was generated from images taken by cameras respectively facing in opposite direction at the same radius from the center of rotation. A symmetric pair of multiperspective panoramas has the characteristic that the epipolar geometry consists of horizontal lines. As such, any traditional stereo algorithm requiring this horizontal epipolar geometry (e.g., a hierarchical warp algorithm) can be employed to compute the desired reconstruction and depth maps.

However, it is desirable that more than two multiperspective panoramas be used to compute the depth map in order to obtain a more accurate and robust correspondence, while still employing the less computationally intense stereo algorithms. Such multi-image stereo matching algorithms do exist, but require a horizontal epipolar geometry between the input images. Fortunately, it has been discovered that under certain circumstances the epipolar geometry between the multiperspective panoramas produced in accordance with the methods of the present invention do sufficiently approximate the required horizontal lines that the aforementioned traditional multi-image stereo matching algorithms can be employed to compute the desired reconstruction. The circumstances that ensure this approximately horizontal epipolar geometry are as follows. First, the distance from the center of rotation to the viewpoints used to capture the images employed to construct the panorama should be no more than about 0.7 of the distance from the center of rotation of each multiperspective panorama to the nearest scene point depicted in the images. Second, in the case of a swing panorama, the off-axis angle should be less than about 15 degrees. If either of these conditions are met, current multi-image stereo matching algorithms can be applied without modification to compute the depth maps (or if only two multiperspective panoramas are available, the less accurate two-image based stereo matching algorithms can be used). It is noted that in the case of a swing panorama, it may be necessary to compensate for a global vertical scaling differences caused by a non-zero off-axis angle before applying the aforementioned traditional algorithms.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

FIGS. 5(a) and 5(b) are images depicting concentric panoramas derived from images taken at two different radial locations. FIG. 5(c) is an image depicting a depth map computed from the concentric panoramas of FIGS. 5(a) and 5(b), among others. FIG. 5(d) is an image depicting a concentric panorama re-synthesized from the depth map of FIG. 5(c). FIGS. 5(e) through 5(g) are images depicting close-up portions of FIGS. 5(a) and 5(b). FIG. 5(h) is an image depicting a close-up portion of FIG. 5(d).

FIG. 10(c) is an image depicting a depth map computed from the swing panoramas of FIGS. 10(a) and 10(b), among others.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
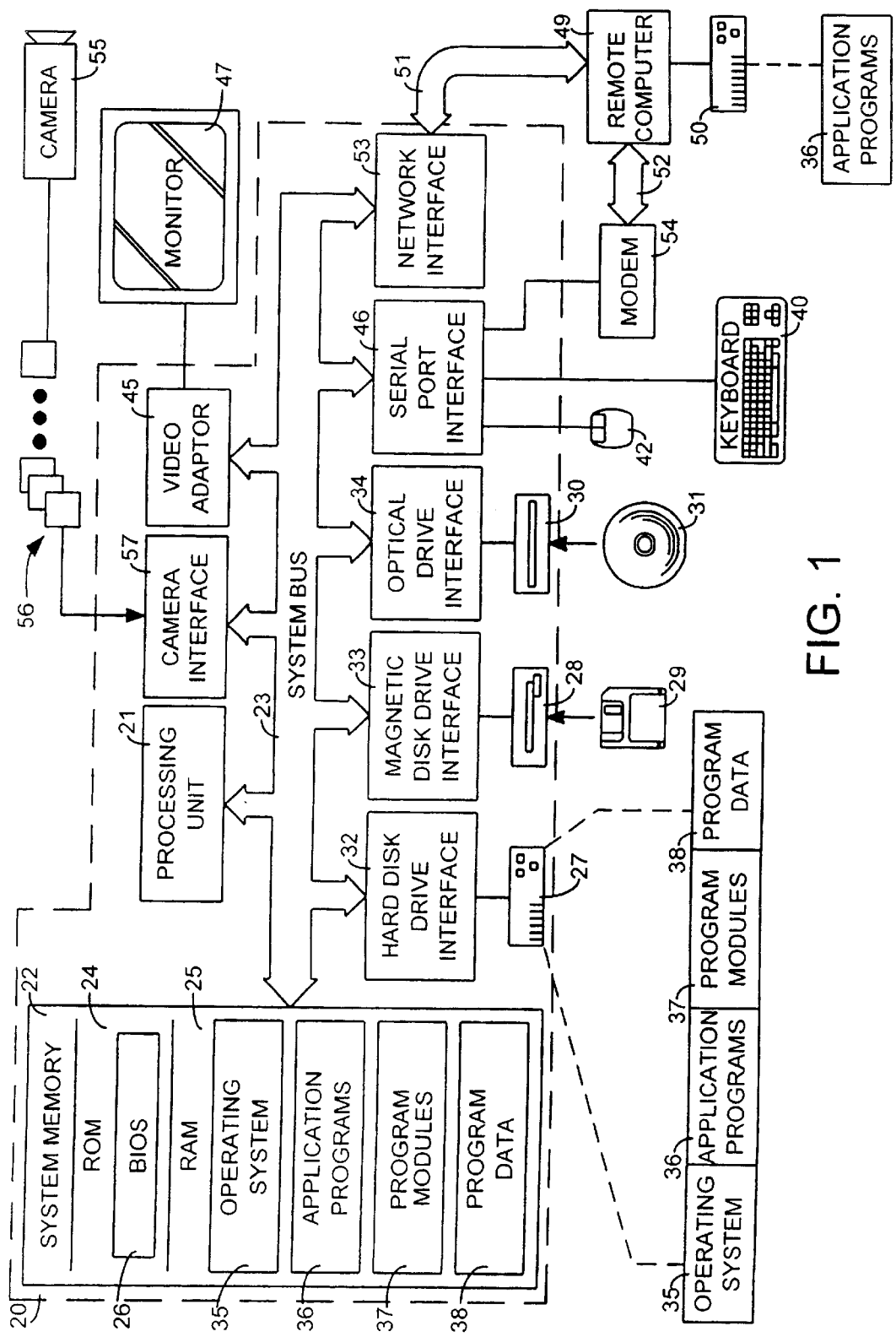
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1 The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules embodying the invention. Generally, the system and process according to the present invention involves a new approach to computing a dense 3D reconstruction associated with a panoramic view of a surrounding scene using multiperspective panoramas derived from a collection of single-perspective images. Only a small number of multiperspective panoramas are needed to obtain a dense and accurate 3D reconstruction, since the panoramas sample uniformly in three dimensions: rotation angle, inverse radial distance, and vertical elevation. Unlike a collection of single-perspective panoramas taken from different locations, there are no preferred directions or areas where the matching fails because the disparity vanishes. Using multiperspective panoramas also avoids the limited overlap between the original input images that causes problems in conventional multi-baseline stereo. The multiperspective panorama approach further differs from stereo matching of panoramic images taken from different locations, where the epipolar constraints are sine curves, in that for multiperspective panoramas, the epipolar geometry, to first order, consists of horizontal lines. Therefore, any traditional stereo algorithm can be applied without modification.

Figure 2:
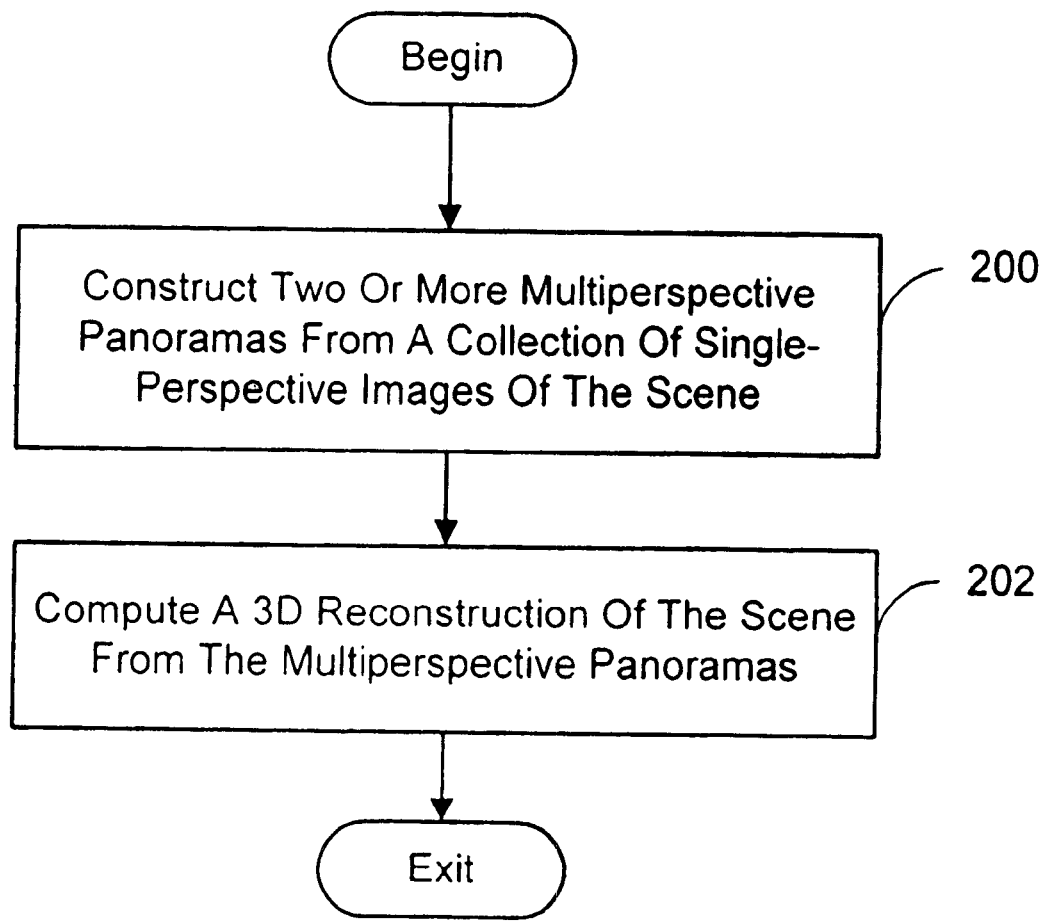
FIG. 2 is a flow chart diagramming an overall process for computing a dense 3D reconstruction associated with a panoramic view of a surrounding scene using multiperspective panoramas according to the present invention.

In general, this approach to computing a dense 3D reconstruction using multiperspective panoramas is accomplished via the following process actions, as shown in the high-level flow diagram of FIG. 2:

a) constructing two or more multiperspective panoramas from the collection of single-perspective images of the scene (process action 200); and, b) computing a 3D reconstruction of the scene from the multiperspective panoramas (process action 202).

A description of what a multiperspective panorama is and details as to their construction will be provided in the first of the following sections (Section 1.0). Then, in Section 2.0, the ways in which these multiperspective panoramas can be used to compute a reconstruction of the scene will be described. Finally, experimental results associated with tested embodiments of the system and process will be provided in Section 3.0, and alternate techniques are described in Section 4.0.

1.0 The Multiperspective Panorama

A multiperspective panorama is essentially a 360 degree panoramic view of a surrounding scene made up of a plurality of side-by-side columnar images depicting consecutive portions of the scene derived from a collection of single-perspective images. Unlike a typical mosaic panorama, however, each of these columnar images represents a portion of the scene captured from a different perspective. Thus, multiperspective panoramas differ from conventional panoramas in that parallax effects are captured due to the varying perspective of the columnar images.

Specifically, each of the columnar images is derived from a different one of the single-perspective images and each single-perspective image is captured at different rotational position with respect to a common center of rotation. This is accomplished by constraining camera motion to a radial path around a fixed rotation center and taking a single perspective image of the scene at a series of consecutive rotation angles around the center of rotation. A particular columnar portion of each of the single-perspective images captured at each consecutive rotation angle is then extracted (or captured as a slit image using line scan sensors such as a linear push-broom camera [5]) and rebinned to form the multiperspective panorama. The idea of resampling and rebinning has recently become popular in image-based rendering. For example, the Lumigraph and Lightfield resample all captured rays and rebin them into a 4D two-plane parameterization [4, 10]. The reason for rebinning input images is to find a representation that facilitates the desired application. For the Lumigraph, this is the re-synthesis of novel views. However, this idea has never been applied to model-based applications such as the present 3D reconstruction of a scene and the computation of depth maps form the reconstruction.

It is noted that the aforementioned columnar portion of the single-perspective image can be of any width, however, it is preferred that it is one pixel column wide. The column may also have any available height desired, but it is preferred the height correspond to the full vertical field of view of the single-perspective images.

The multiperspective panoramas generated in accordance with the present invention are somewhat related to known configuration such as multiperspective panoramas for cel animation [24], multiple-center-of-images [16], manifold mosaics [14], and circular projections [13], and related to images obtained by push broom cameras [5] and panning non-frontal imaging cameras [8]. However, unlike these approaches, the present multiperspective panoramas are produced by constraining the camera motions along radial paths around a fixed rotation center. It is this constraint that enables the use of a simple surface sweep stereo correspondence process to compute a 3D reconstruction for the scene, and under certain conditions results in a horizontal epipolar geometry that allows the use of traditional stereo reconstruction algorithms to compute the reconstruction.

While single-perspective images having the attributes discussed above can be capture in any appropriate manner, it is preferred that the methods disclosed in a co-pending patent application be employed (also see reference [20]). The co-pending application is entitled RENDERING WITH CONCENTRIC MOSAICS and assigned to the common assignee hereto. The application was filed on May 11, 1999 and assigned Ser. No. 09/309,753. The subject matter of this co-pending application is hereby incorporated by reference. The co-pending application primarily describes two camera rigs that can be used to capture the single-perspective images needed to produce the multiperspective panoramas associated with the present invention. The first rig uses several "slit cameras" (or "regular" perspective cameras where only a single pixel column is kept) mounted on a rotating bar such that their optical axis is tangent to the circle traced out by the bar. The other camera rig uses a single perspective camera mounted on a rotating bar looking outwards. The particulars of each of these configuration will now be described in the sub-sections below.

1.1 Concentric Panoramas or Mosaics

Figure 3:
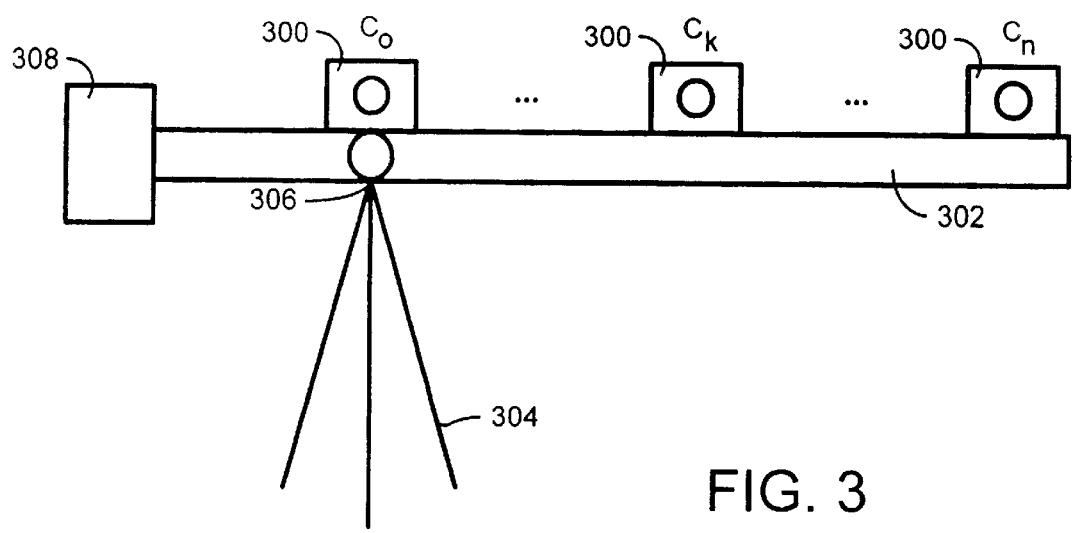
FIG. 3 is a diagram showing a side view of a simplified setup for capturing slit images of a real 3D scene using cameras.

As mentioned above, one way of accomplishing the constrained camera motion needed to capture the required single-perspective images is to employ the first of the aforementioned camera rigs shown in FIG. 3. This first rig preferably entails mounting several cameras 300 ($C_o$, ... $C_k$, ...,$C_n$) on a rotating horizontal beam 302. While, only three cameras 300 are shown in FIG. 3, there would actually be many more positioned along the rotating beam. In the depicted case, the beam 302 is raised up from "ground level" by a support 304. This expands the vertical field of view. The interface between the support 304 and the beam 302 is configured to allow the beam to be rotated a full 360 degrees. Thus, this interface defines a center of rotation 306. The plane defined by the circular region swept out by rotating the beam 360 degrees is a circle plane (which in the depicted case is a horizontally oriented plane), and the circles traced out by the focal point of each camera on the beam when the beam is rotated constitute concentric circles on the circle plane. The depicted multiple camera configuration is preferred as several of the concentric mosaics can be created simultaneously. However, it would also be feasible to use just one camera and move its radial location on the beam prior to each rotation of the beam.

The cameras 300 may be so-called "slit" or "vertical line" cameras in that only the center line of each image of the 3D scene is captured. These images will hereinafter be referred to synonymously as "slit" images, image columns, or image lines. Preferably, the prescribed width of the slit images is as narrow as possible—ideally the width of a single pixel. Alternatively, standard perspective cameras can be employed. Such cameras will produce an image of the scene having some horizontal field of view. However, only the center portion of this horizontal field will be used, and preferably only the single, center pixel column is used. This center portion or column is extracted from the perspective image via conventional methods.

A multiperspective panorama is constructed by collecting slit images at a series of rotation angles as the camera is rotated a full 360 degrees. The images are captured with a frequency, which given the prescribed width of the images and the speed of rotation, will produce images that when placed side-by-side in the order they were taken, form a complete multiperspective panoramic view of the surrounding scene. Ideally, the camera motion is made continuous and at a uniform speed for the full 360 degrees of rotation. This will ensure the images will line up perfectly with no overlaps or gaps. The multiperspective panoramas created with the foregoing camera rig are called concentric panoramas or mosaics because each is derived from a camera rotating along one of several concentric circular paths.

Figure 4:
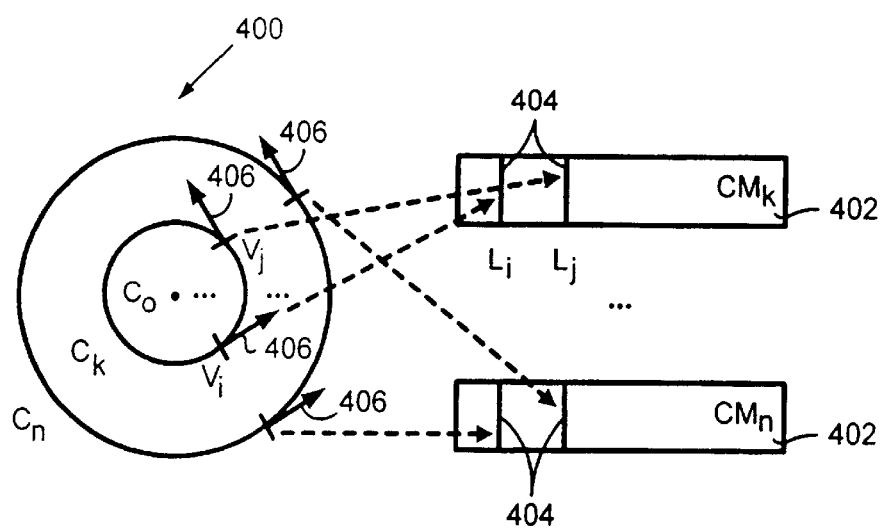
FIG. 4 is a diagram showing concentric circles on the circle plane and concentric panoramas associated with each circle.

The process of creating a series of consecutive slit images that collectively depict the surrounding 3D scene is performed for each of the concentric circles 400 on the circle plane to form a collection of concentric panoramas or mosaics 402, as shown in FIG. 4. In the illustration of the process in FIG. 4, the left hand side shows a series of concentric circles including the center of rotation $C_0$ (i.e., a circle with a radius of zero), one of the intermediate circles $C_k$, and finally an outermost circle $C_n$. Slit images are captured by moving a camera along each of the concentric circles and capturing the view of the 3D scene in directions tangent to one of the concentric circles in the circle plane. The geometry of this procedure is best seen in the right-hand side of FIG. 4. As can be seen, each slit image L (depicted as lines 404) is captured at a viewpoint v (identified by the short radial lines 406) on a concentric circle 400 in the circle plane, in a direction tangent to the circle. These slit images 404 captured by the camera rotation along each circle 400 are combined in an side-by-side manner to form respective concentric panoramas, such as $CM_k$ and $CM_n$ shown in FIG. 4. These concentric panoramas are illustrated in an "unwrapped" form by the rectangles 402.

To this point, the process of creating concentric panoramas of a surrounding 3D scene has involved capturing images of a real scene using cameras. However, the present invention is not limited to generating the concentric mosaics from a real 3D scene. The concentric mosaics can also be generated synthetically using any appropriate graphics program capable of producing a 3D scene. Essentially, these programs can be employed to generate slit images of the desired dimensions, which depict a portion of a surrounding synthetic 3D scene as would be captured by a camera rotating at radius R from the center of rotation. Accordingly, in the description of computing a 3D reconstruction from the concentric panoramas that is to follow, it should be understood that the captured slit images can refer to either real images or synthetic images.

Examples of synthetic concentric panoramas generated as described above can be seen in FIGS. 5(a) and (b), each of which represents what would be captured with cameras having normalized radii of 1.0 and 0.7, respectively. Additionally, FIGS. 5(e) through (g) depict close-ups of portions of the synthetically generated concentric panoramas showing the horizontal parallax captured in the panoramas.

1.2 Swing Panoramas

Figure 6:
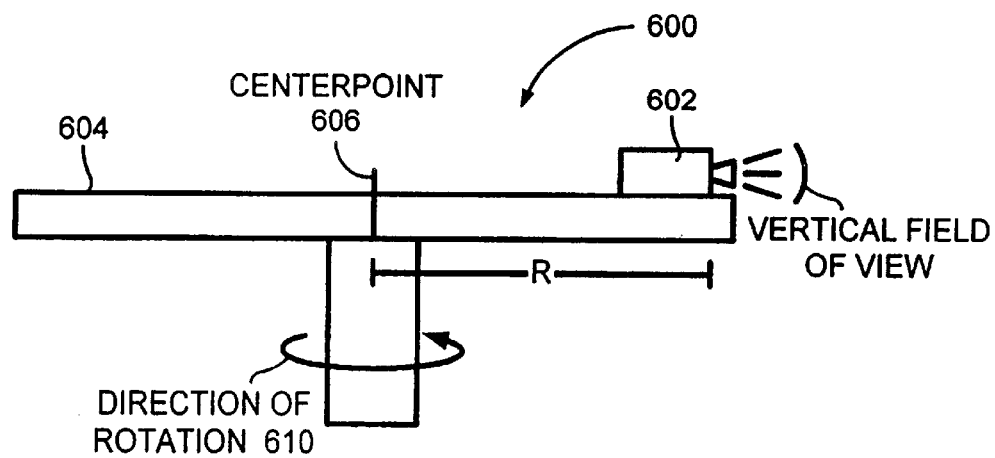
FIG. 6 is a side elevational view of another camera setup according to the present invention for providing swing panoramas wherein a single camera is mounted on a rotating table to capture a real scene.

The other preferred way of accomplishing the constrained camera motion needed to capture the required multi-perspective images is to employ the alternate camera rig shown in FIG. 6. This camera configuration essentially involves swinging a "regular" perspective camera mounted on a rotating bar or table looking outwards. In this case, different image columns of the resulting single-perspective images are used to construct different multiperspective panoramas. And more particularly, the image column occupying the same relative horizontal location in each single perspective image is used to construct a multiperspective panorama. These panoramas are called swing panoramas.

Specifically, referring to FIG. 6, the camera set-up 600 uses a single camera 602 that is moved (i.e., swung) along a circular path in a plane. In particular, the camera is mounted to a bar or table 604 that rotates the camera 602 at a radius R about a center point 606 (where R is measured from the center point to the camera's focal point). As indicated by arrow 610, the table is rotated in a clockwise direction at constant speed, but may also be rotated in the counterclockwise direction if desired.

Figure 7:
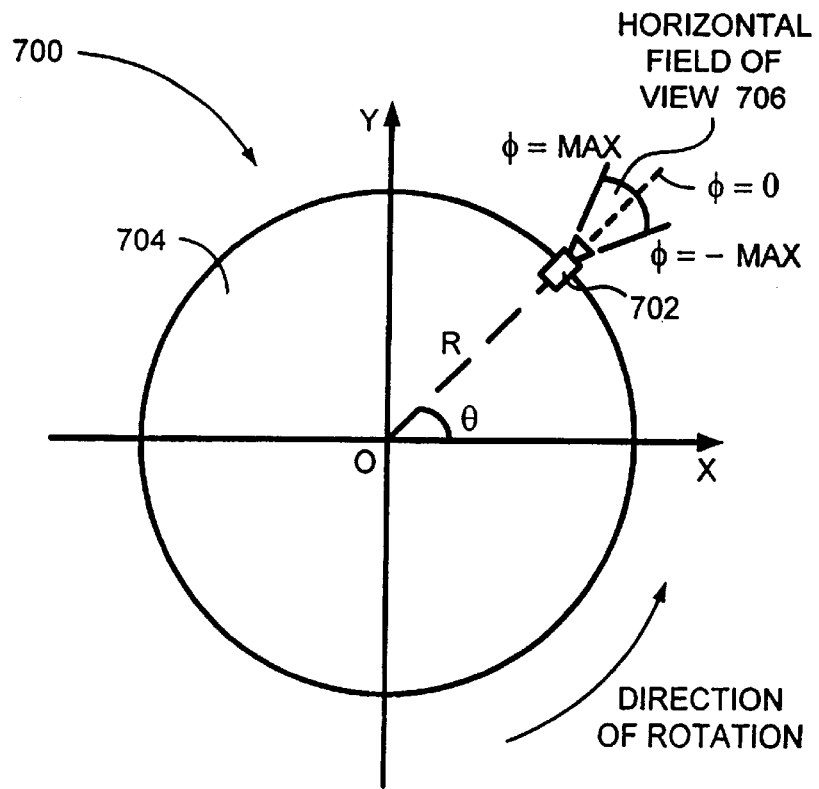
FIG. 7 shows a top view of the camera and rotating table of FIG. 6.

Referring now to the top view of the swing panorama camera rig 700 shown in FIG. 7, the camera 702 moves along a circular path 704 defined by the focal point of the camera and has its viewing direction positioned perpendicular to the circular path (as opposed to tangent as in the case of a concentric panorama camera rig). As indicated at 706, the camera 702 has a constant horizontal field of view. Light rays enter the camera 702 at different angles or ray directions across the entire horizontal field. For the purposes of illustration, a light ray farthest to the right of the camera's horizontal field of view 706 is designated as angle $\phi=-MAX$. Similarly, a light ray entering on the farthest left side of the horizontal field of view 706 has a ray direction designated as $\phi=MAX$, wherein the values of $\phi=MAX$ and $\phi=-MAX$ are a function of the camera used. Centrally located in the horizontal field of view 706 is the camera viewing direction designated as φ=0. As the camera 702 rotates along the circular path, it position can be defined by an angle θ.

Figure 8:
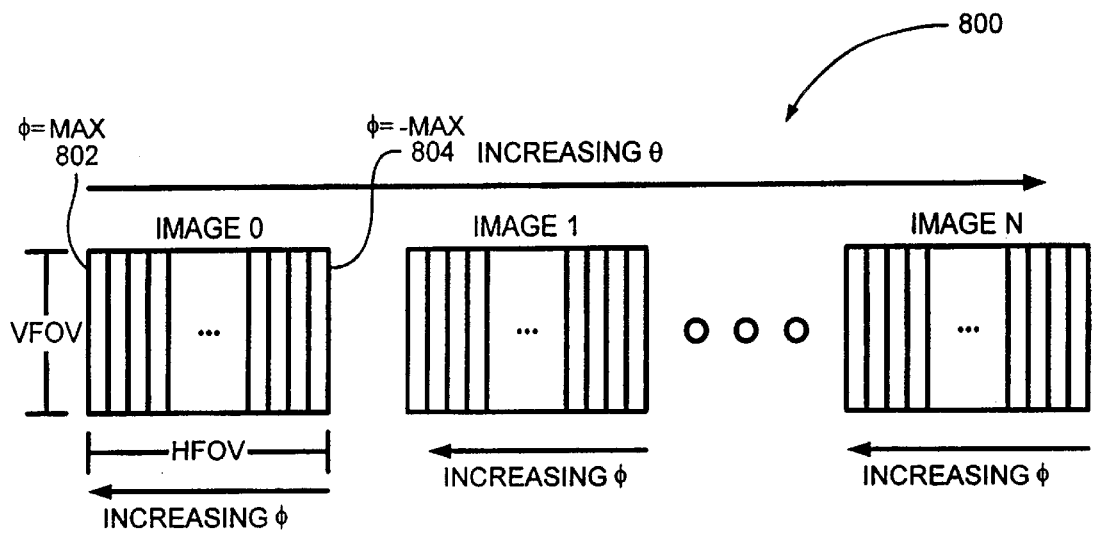
FIG. 8 is a diagram illustrating a sequence of images captured by the camera of FIG. 6.

Referring to FIG. 8, the sequence of images 800 captured by the aforementioned camera are numbered such that image 0 is the first image captured at a predetermined starting point. For example, image 0 may be the image captured when the camera 702 crosses the x-axis of FIG. 7. The images are characterized for the purposes of the present invention as being formed of a plurality of vertically aligned, discrete image columns, such as imagecolumn 802, that have a height corresponding to the vertical field of view of the camera. Each image column has a different ray direction or angle φ associated with it. For example the leftmost image column 802 in image 0 corresponds to φ=MAX, whereas the rightmost column 804 corresponds to φ=−MAX. For any particular value of φ there are a plurality of pixels extending for the vertical field of view to define the height of the image. In addition, a predetermined number of image columns make up the width of the image. The number of pixels defining the height is a function of the vertical field of view of the camera, and the number of image columns making up the width of the image is a function of how may pixel columns constitute an image column. As mentioned previously, it is preferred that each image column constitute a column one pixel wide.

Figure 9:
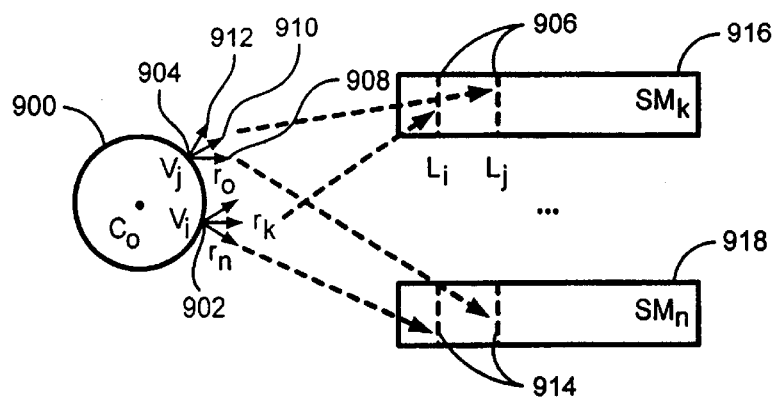
FIG. 9 is a diagram showing the path of a camera on a plane and swing panoramas derived from images captured on the path.

FIG. 9 illustrates how the captured images may be used to form a swing panorama. The circle 900 represents the circle that the camera rotates on. At each viewpoint (e.g., $v_i$ and $v_j$) 902, 904 along the circle 900 that the camera captures an image of the scene, the image columns making up the captured image can be identified by indexed rays (e.g., $r_o$, $r_k$, and $r_n$) 908, 910, 912 on the circle plane, each of which corresponds to a particular value of φ. A swing panorama, such as the depicted $SM_k$, is formed by combining in a side-by-side manner the image columns 906 having the same angle φ, associated with ray $r_k$, taken from the images captured at each sequential rotation angle θ. Other swing panoramas may be formed by using different values of φ, such as the depicted $SM_k$ which is formed by combining the image columns 914 associated with the ray $r_n$ from each image captured at each sequential angle θ. In general, a series of images such as a video sequence of F frames of size W×H can be rebinned into (up to) W panoramas with size F×H. It is noted that, here again, the panoramas are illustrated in an "unwrapped" form by the rectangles 916 and 918, respectively.

FIGS. 10(*a*) and 10(*b*) show examples of swing panoramas that were generated using a camera set-up such as described above. The panorama shown in FIG. 10(*a*) was formed using the leftmost image column from each single-perspective image, whereas the panorama of FIG. 10(*b*) was formed using the center image column of the single-perspective images. While the depicted examples were generated from actual images of a scene, it is noted that swing panoramas can also be generated synthetically using any appropriate graphics program capable of producing a 3D scene, just as in the case of a concentric panorama.

1.3 The Imaging Geometry of Multiperspective Panoramas

Figure 11:
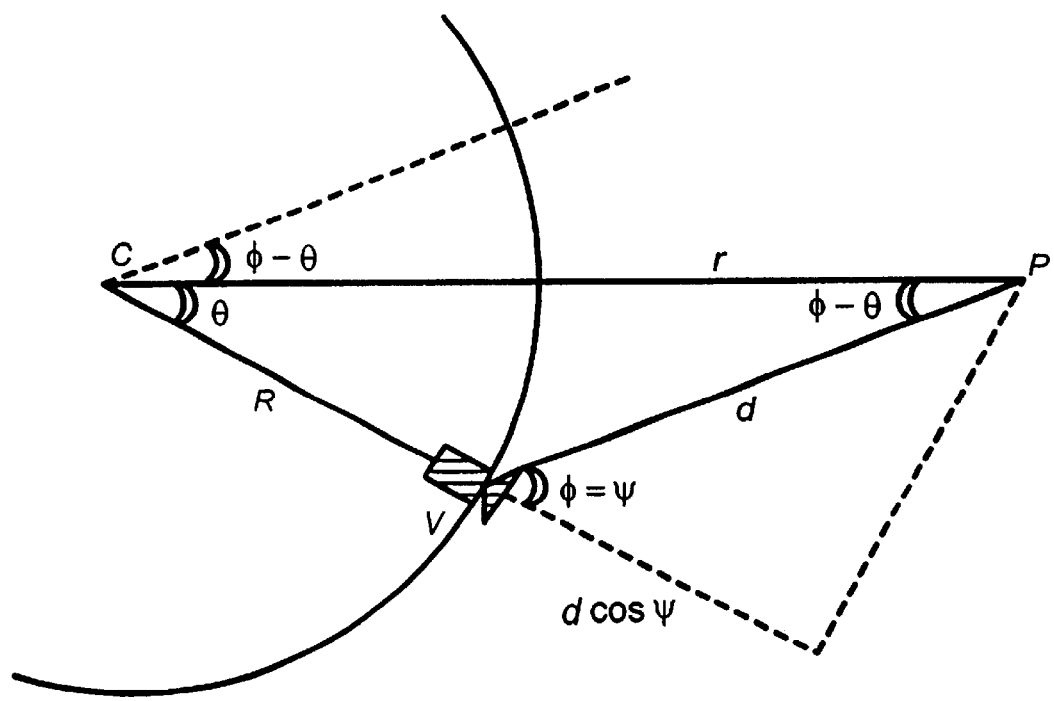
FIG. 11 is a diagram showing the geometric and trigonometric relationships for a multiperspective panorama.

The imaging geometry and trigonometric relationships for a single multiperspective panorama created in accordance with the present invention can be generalized as shown in FIG. 11. The generalized geometry and trigonometric relationships will be used in subsequent sections to define the horizontal and vertical parallax captured in each panorama and to show that an essentially horizontal epipolar geometry exist between multiperspective panoramas under certain circumstances. These are needed in turn to describe how a 3D reconstruction can be generated from a set of multiperspective panoramas.

Referring to FIG. 11, a top-down view shows the center of rotation C around which the camera rotates along a radius of size R. The camera is located at V, and the selected column of pixels is looking at a scene point P, which is at a distance from the center C, and at an in-plane distance d from the camera V. The current angle of rotation is denoted by θ, and varies between 0° and 360°. In a panoramic image, θ forms the horizontal axis. A typical rebinned panoramic image may have 1280 columns, each one taken from the same column in successive frames of a given input video. The other (vertical) axis in the panoramic image is indexed by the elevation or row number y (not shown in the top-down figure).

The plane of pixels captured by a particular panoramic imager forms an angle φ with the swing line in the normal direction connecting V and C. When multiple columns are selected from a camera pointing outward from C (the "swing panorama" configuration), it follows that $\phi=\tan^{-1}((x-x_c)/f)$, where x is the column number in the input image, $x_c$ is the center column, and f is the focal length in pixels. In the concentric panorama configuration, φ=90°. In order to generalize the geometry, the angle ψ between the optical axis of the camera and the column being rebinned is introduced. In swing panoramas, ψ=φ, whereas in concentric panoramas, ψ=0, because while the tangential viewing direction of the camera in the concentric panorama case yields φ=90°, the angle between the optical axis of the camera and each slit image captured is 90°.

To summarize, each panoramic image is indexed by (θ, y), and its acquisition geometry is parameterized by (R, φ, ψ). In the most common acquisition setups, either $\phi_k=\psi_k=\tan^{-1}(kw)$, k=−K . . . K, where kw=(x−$x_c$)/f (swing panoramas), or φ=±90°, ψ=0, $R_k=kR_1$, k=0 . . . K (concentric panoramas).

1.4 Analysis of Parallax

In order to compute a 3D reconstruction from a multiperspective panorama, it is necessary to define the horizontal and vertical parallax captured in these rebinned images. In this section, the formulas for the horizontal and vertical parallax of a point located on a cylindrical surface of radius r are derived.

Using the basic law of sines for triangles, $$\frac{R}{\sin(\phi-\theta)} = \frac{r}{\sin(180°-\phi)} = \frac{d}{\sin\theta}, \text{ or} \quad (1)$$

$$\theta = \phi - \sin^{-1}\left(\frac{R}{r}\sin\phi\right). \quad (2)$$

Therefore, the horizontal parallax $\Delta\theta_{2:1}=\theta_2-\theta_1$ for a point at a distance r seen in two panoramic images $I_1$ and $I_2$ consists of a constant factor $\phi_2-\phi_1$ and two terms depending on r. If each panoramic image is shifted (circularly) by $\phi_i$, the first factor drops out, leaving $$\Delta\theta_{2:1} = \sin^{-1}\left(\frac{R_1}{r}\sin\phi_1\right) - \sin^{-1}\left(\frac{R_2}{r}\sin\phi_2\right). \quad (3)$$

The vertical parallax can be derived using the following observation. Recall that according to the laws of perspective projection, the appearance (size) of an object is inversely proportional to its distance along the optical axis, e.g., u=fx/z, v=fy/z. For pixels at a constant distance r from C, and therefore a constant distance from V along the optical axis, the vertical scaling can be computed directly from this distance $z = d \cos \psi$. Here, d is the in-plane distance between V and P, and $d \cos \psi$ is the distance along the optical axis (as mentioned before, typically $\psi = \phi$ or $\psi = 0$).

This scale factor can be written as $s = f/z = f/(d \cos \psi)$. Using the law of sines (1) again, the change of scale between two panoramic images can be computed as $$s_{2:1} = \frac{s_2}{s_1} = \frac{d_1 \cos\psi_1}{d_2 \cos\psi_2} = \frac{\sin\theta_1 / \sin\phi_1}{\sin\theta_2 / \sin\phi_2} \frac{\cos\psi_1}{\cos\psi_2}.$$

Expanding $\sin \theta$, where $\theta$ is given by (2), it follows that $$\sin\theta = \sin\phi\cos\left(\sin^{-1}\left(\frac{R}{r}\sin\phi\right)\right) - \cos\phi\frac{R}{r}\sin\phi$$

$$= \sin\phi\left[\sqrt{1 - \left(\frac{R}{r}\sin\phi\right)^2} - \frac{R}{r}\cos\phi\right].$$

Thus, the scale change can be re-written as $$s_{2:1} = \frac{\sqrt{1 - \left(\frac{R_1}{r}\sin\phi_1\right)^2} - \frac{R_1}{r}\cos\phi_1}{\sqrt{1 - \left(\frac{R_2}{r}\sin\phi_2\right)^2} - \frac{R_2}{r}\cos\phi_2} \frac{\cos\psi_1}{\cos\psi_2}. \quad (4)$$

The first factor in this equation depends on r, and goes to 1 as $r \to \infty$. The second factor is a global scale that compensates for the off-axis angle of a given column. This is the same correction that is applied to rectilinear (perspective) images when converting them into cylindrical coordinates [23]. The vertical parallax for any pixel in row $y_1$ of image $I_1$ can be computed directly from $$\Delta y_{2:1} = y_2 - y_1 = (s_{2:1} - 1) y_1. \quad (5)$$

2.0 Computing 3D Reconstruction from Multiperspective Panoramas

Multiperspective panoramas make it simple to compute a 3D reconstruction and depth map associated with a panoramic image of the scene. For example, the reconstruction and depth map can be generated using a unique cylindrical sweeping approach, or if conditions are right, traditional stereo matching algorithms.

2.1 Cylindrical Sweep Approach to 3D Reconstruction

A multi-image cylindrical sweep approach can be employed to compute a 3D reconstruction of the scene from the multiperspective panoramas. This approach is an expansion of known stereo algorithms, particularly the concept of plane sweep stereo.

Plane-sweep and space coloring/carving stereo algorithms have recently become popular, because they support true multi-image matching [3], enable reasoning about occlusion relationships [18, 22, 9], and are more efficient than traditional correlation-based formulations [6]. Traditional stereo matching algorithms pick a window around each pixel in a reference image and then find corresponding windows in other images at every candidate disparity (searching along an epipolar line). Plane sweep algorithms consider each candidate disparity as defining a plane in space, and projecting all images to be matched onto that plane, using a planar perspective transform (homography) [3, 22, 1]. A per-pixel fitness metric is then computed which may be aggregated spatially. After all the cost functions have been computed, a winning disparity can be chosen.

As stated above, the cylinder sweep approach according to the present invention preferably expands upon the plane sweep algorithms to allow a 3D reconstruction of a scene to be computed directly from a set of two or more multiperspective panoramas. In general, this is accomplished by projecting multiperspective panoramas onto cylinders of varying radii r. The transformations that map panoramas onto these cylinders, and hence onto each other, are particularly simple. The re-projection of each panoramic image onto a cylindrical surface of radius r merely consists of a horizontal translation and a vertical scaling. The proof follows directly from equations (3) and (4) for horizontal and vertical parallax. A less formal but more intuitive proof is to just observe that the image of any column of a cylinder at a fixed radius r seen by a concentric pushbroom camera is just a scaled version of the pixels lying on that cylinder. Since the multiperspective panorama representation has no preferred direction, the shift between the panoramic image and the cylinder must be the same for all pixels.

The example cylindrical sweeping approach specifically involves projecting the pixels of each multiperspective panorama onto a series of concentric cylindrical surfaces each of which has a greater radius than the previous one, and each of which has a radius that exceeds all the multiperspective panoramas that are being used to compute the desired reconstruction of the scene. It is noted that the change in the radius for each consecutive cylindrical surface should be made as small as possible, in light of computational limitations, so as to maximize the precision of the resulting depth map. As indicated above, this projection of the pixels of each multiperspective panorama onto a particular cylindrical surface simply consists of a horizontal translation and a vertical scaling using equations (3) and (5), respectively.

Figure 12:
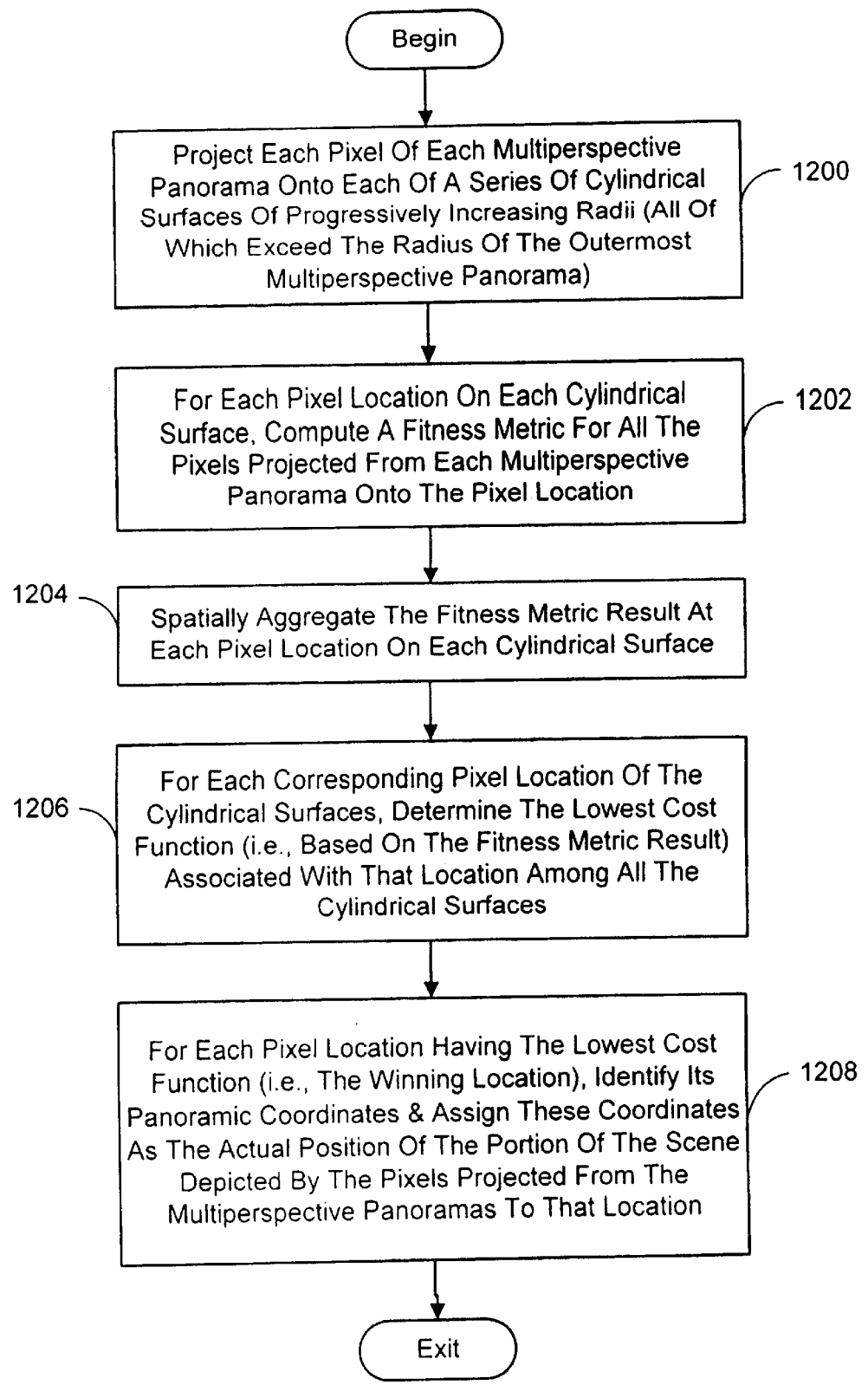
FIG. 12 is a flow chart diagramming a cylindrical sweeping process according to the present invention for accomplishing the reconstruction module of the overall process of FIG. 2.

Referring to FIG. 12, one preferred implementation of the cylindrical sweep approach is presented. As can be seen, each multiperspective panorama that is to be used to compute the reconstruction is projected onto each cylindrical surface (process action 1200). For each of these cylindrical surfaces, an appropriate fitness metric is computed for all the pixels projected from each of the multiperspective panorama onto the same pixel location of the cylindrical surface (process action 1202). This is repeated for each pixel location on the cylindrical surface. For example, this metric could be the variance in some prescribed pixel characteristic, such as pixel intensity or color. It is also preferred (although optional) that the result of the metric employed be spatially aggregated at each pixel location of each cylindrical surface using an appropriate convolution technique (process action 1204). For example, a moving average box filter technique could be used, or the other techniques, such as the technique described in reference [17].

The result of the metric (once spatially aggregated if desired) is essentially a cost function. The theory behind the cylindrical sweep approach is that the pixels in each multiperspective panorama, which depict the same portion of the scene, will converge to approximately the same location on one of the candidate cylindrical surfaces. Thus, the pixel location on a cylindrical surface having the lowest cost function in comparison to the cost function computed for the corresponding location on the other surfaces (i.e., the "winning" location) should correspond to the actual position of the portion of the scene depicted by the pixels projected from the multiperspective panoramas to that location. It is noted that not all the pixels projected from the multiperspective panoramas to the "winning" location may depict the same portion of the scene due to possible occlusions in some of the panoramas employed. It is further noted that by analyzing the cost function data starting with the cylindrical surface having the smallest diameter and working out from there, it is possible to determine any occlusion relationships depicted in the multiperspective panoramas via conventional methods [18]. In view of the above, the next process action 1206 is to determine, for each corresponding pixel location of the cylindrical surfaces, the lowest cost function associated with that pixel location among all the cylindrical surfaces. For each "winning" location, the panoramic coordinates are identified and assigned as the actual position of the portion of the scene depicted by the pixels projected from the multiperspective panoramas to that location (process action 1208). The panoramic view coordinates are defined by the vertical height of the pixel location on the cylindrical surface, the rotation angle with respect to the center of rotation and the radius of the cylindrical surface from the center of rotation.

In the foregoing way, the actual position in panoramic coordinates of the portion of the scene depicted in the pixels of the multiperspective panoramas can be determined. Based on this information, a depth of the scene can be computed in the conventional manner. Essentially, the depth map is a panoramic image of the scene where the distances or depths from the center of rotation associated with the multiperspective panoramas to the portion of the scene depicted by each pixel is represented by a particular intensity value.

While the foregoing implementation of the cylindrical sweep approach represents one preferred example, it is noted that other variations are possible and may be employed as desired. Loosely speaking, traditional methods of computing dense stereo depth can be divided into two classes. The first class of methods allow every pixel to independently select its disparity. These methods typically use statistical methods and are usually based on a correlation of some type. The above-described implementation of the cylindrical sweep process employs one such correlation technique to determine the winning pixel locations. However, other existing correlation-based methods could be used instead, as desired. In addition, the aforementioned second class of methods could be used to determine the winning pixel locations. Essentially, this second class of methods finds the depth map that minimizes some function associated with the pixels, usually called the energy or the objective function, using some optimization technique. In other words, the best set of depth values are simultaneously found by minimizing a global cost criterion. These methods are generally referred to as global optimization or global regularization techniques. It is envisioned that global optimization techniques could also be employed to determine the winning pixel locations, rather than the correlation-based method (or variation thereof) described in the above example. The exact energy function and optimization method employed will depend on the application, but can be selected from any of the current global energy minimization techniques.

2.2 Generating 3D Reconstructions Using Traditional Stereo Matching Algorithms When an Approximately Horizontal Epipolar Geometry Exists Between Multiperspective Panoramas It was mentioned earlier that if conditions are right, traditional stereo matching algorithms can also be employed without modification to compute the desired 3D reconstruction (and so a depth map) of the scene. This would have advantages as these types of algorithms can be less computationally intensive than the previously-described cylindrical sweeping approach.

One example of the right conditions involves the use of two of the multiperspectives that constitute symmetric pairs. A symmetric pair of multiperspective panoramas exists where, referring once again to FIG. 11, the optical rays used to construct two multiperspective panoramas are symmetric with respect to the swing line $\overline{CV}$, i.e., $\phi_1 = -\phi_2$ (also assuming that $\psi_i = \phi_i$ or $\psi = 0$). This occurs when, for example, the left and right columns of a swing stereo sequence are selected or when two oppositely facing cameras are fixed at equal distances but at opposite ends of a rotating boom (concentric panorama). For a symmetric pair of concentric multiperspective panoramas, the epipolar geometry consists of horizontal lines. This follows directly from equation (4), i.e., $s_{2:1} = 1$. A more informal proof could be obtained by drawing another point P' in FIG. 11 at an angle $-\phi$, and observing that $z = d \cos \psi$ is the same for both viewing rays. A direct consequence of selecting such a pair of panoramic images is that any traditional stereo algorithm (e.g., hierarchical warp [15, 2]) can be used, to compute the desired reconstruction.

However, in practice it is desirable to use more than two images, in order to obtain a more accurate and robust correspondence [12, 3], but it is also desirable to avoid having to be restricted to the previously described cylindrical sweep approach for computing depth maps. In this section, it will be discussed whether the epipolar geometry is sufficiently close to a horizontal epipolar geometry so that other traditional multi-image stereo matching algorithms (such as SSSD [12]) could be used instead. A requirement for a traditional multi-baseline stereo algorithm to be applicable is that the location of pixels at different depths can be explained by a collection of pinhole cameras. In the present case, a further requirement is that horizontal epipolar geometry apply, in which case the horizontal parallax would be of the form $$\Delta\theta_{k:0} = m_k f(r),$$

i.e., that a fixed linear relationship exists between horizontal parallax and some common function of r for all images. The horizontal parallax equation given in (3) does not exactly satisfy this requirement. However, if either R/r or sin $\phi$ are small in both images, then $$\Delta\theta_{k:0} \approx [R_k \sin \phi_k - R_0 \sin \phi_0] r^{-1} \qquad (6)$$

It can therefore be seen that inverse r plays the same role as inverse depth (disparity [12]) does in multi-baseline stereo.

Figure 13:
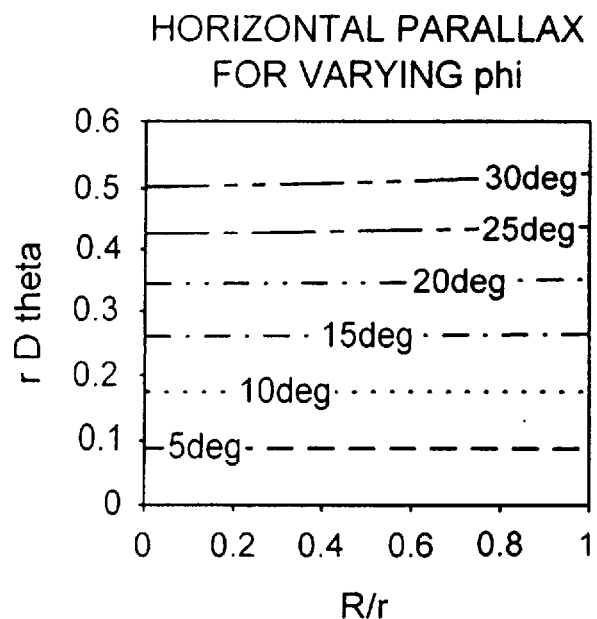
FIGS. 13 and 14 are graphs plotting horizontal parallax for varying values of φ and R, respectively.
Figure 14:
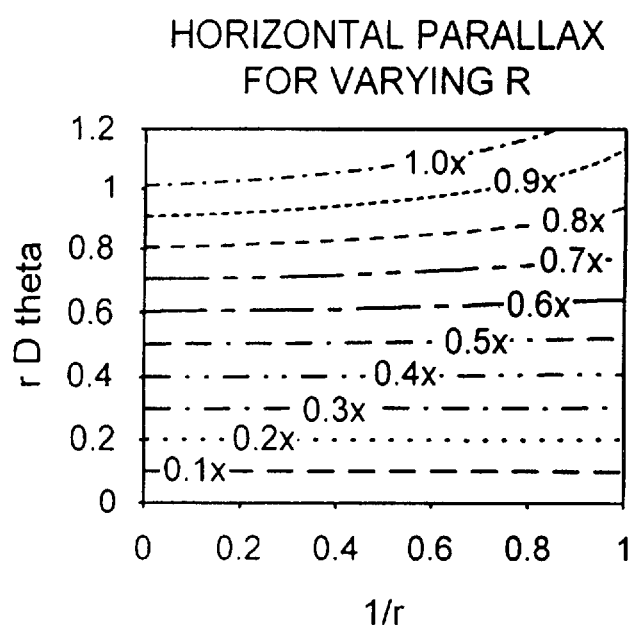

FIGS. 13 and 14 plot the exact formula (3) for horizontal parallax as a function of $r^{-1}$ for various values of $\phi$ and R. The plot of FIG. 13 shows the ratio of $\Delta\theta_{k:0}$ to 1/r (since it is very hard to tell the deviation from linearity by eye) for $\phi_0 = 0$ (central column) and varying $\phi_k$ (swing panoramas). The plot of FIG. 14 shows the ratio of $\Delta\theta_{k:0}$ to 1/r for $R_0 = 0$ (no parallax) and varying $R_k$ for concentric panoramas with $\phi_k = 90°$ and $\psi_k = 0$. As can be seen from these plots, the linear approximation to parallax is quite good, as long as the nearest scene point doesn't get too close, e.g., no closer than 50% of R for moderate focal lengths. The reduced linearity in the concentric stereo rig can be mitigated by spacing the cameras more closely, i.e., not using the full baseline of the arm if scene points are too close.

A second requirement of assuming a horizontal geometry is that the vertical parallax needs to be negligible (preferably under one pixel). For images of about 240 lines (a single field from NTSC video), it is desired that $|\Delta y| \leq 120|s_{2:1} - 1| < 1$ (120 is the half-height of the image), i.e., $|s_{2:1} - 1| < 0.008$.

The vertical parallax equation (4) can be approximated under two different conditions. For swing stereo ($R_1 = R_2$, $\psi = \phi$), assume that $\phi_2 = 0$ (central column) and $\phi_1$ is small. If so equation (4) can be expanded to obtain $$s_{2:1} \approx \cos\psi_1 \left[ 1 - \frac{R^2}{2r^2} \sin^2\phi_1 - \frac{R}{r} + \frac{R}{2r} \sin^2\phi_1 \right] \left[ 1 + \frac{R}{r} \right] \qquad (7)$$

$$\approx \cos\psi_1 \left[ 1 + \frac{R}{2r} \sin^2\phi_1 \right]$$

Thus, once the global scale change by $\cos\psi_1$ (which is independent of depth) is compensated for, there is a vertical parallax component that is linear in R/r and quadratic in $\sin\phi$.

For concentric panoramas, $\phi=90°$ and $\psi=0$, which means $$s_{2:1} = \frac{\sqrt{1 - R_1^2/r^2}}{\sqrt{1 - R_2^2/r^2}} \approx 1 + \frac{1}{r^2}(R_2^2 - R_1^2).$$

Figure 15:
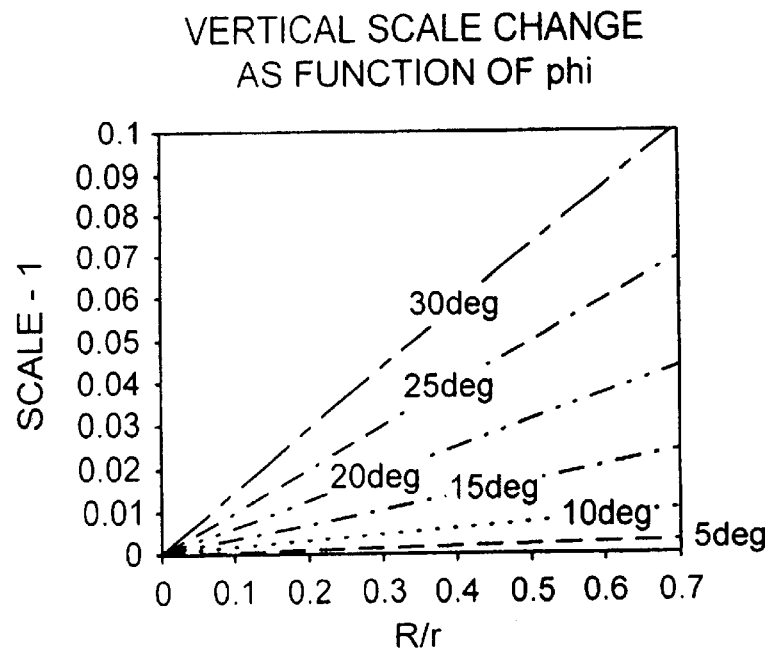
FIGS. 15 and 16 are graphs plotting vertical parallax for varying values of φ and R, respectively.
Figure 16:
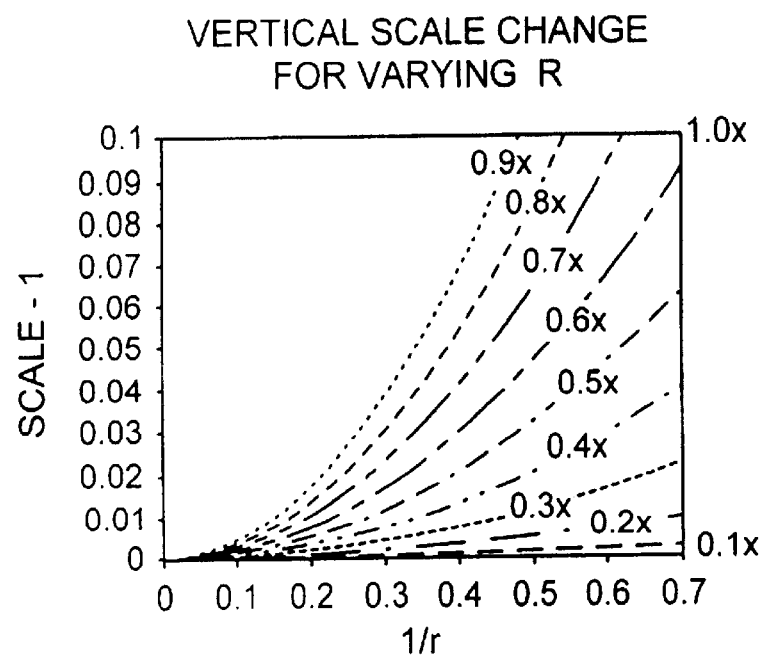

The vertical parallax is inversely proportional to squared distance r, and proportional to the difference in squared radii R. FIGS. 15 and 16 plot the exact formula (4) for vertical parallax as a function of $r^{-1}$ for various values of $\phi$ and R. The plot of FIG. 15 shows scale change $s_{k:0}-1$ for $\phi_0=0$ (central column) and varying $\phi_k$ (swing panoramas). The plot of FIG. 16 shows $s_{k:0}-1$ for $R_0=0$ (no parallax) and varying $R_k$ (concentric panoramas with $\phi_k=90°$ and $\psi_k=0$). As can be seen from these plots, the amounts of vertical parallax are quite small (<1%) if the field of view is moderately small (say about 30°) or the ratio of the nearest scene point to the variation in radial camera positions is large.

Figure 17A:
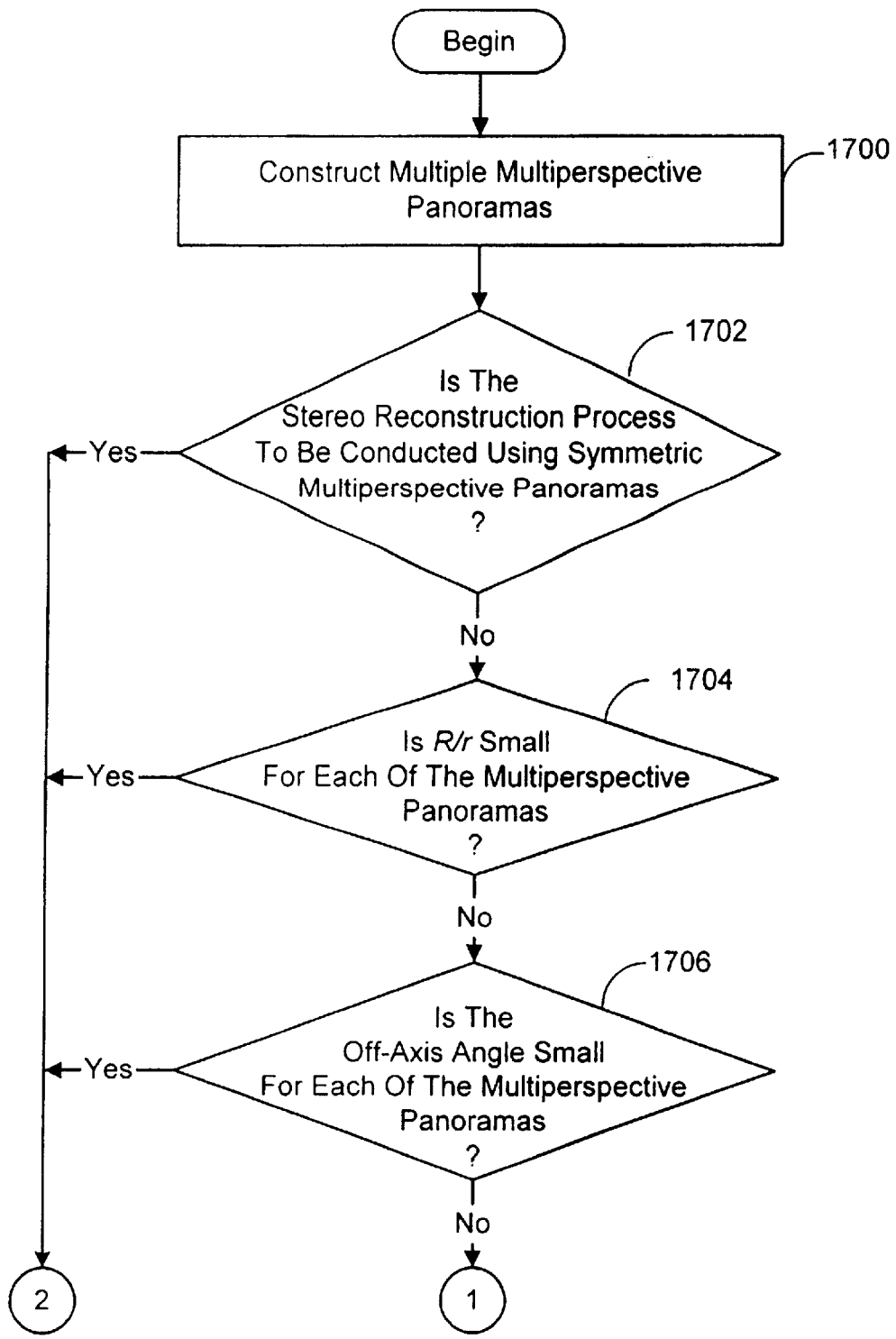
FIGS. 17A and 17B are flow charts diagramming an expanded overall process for computing a dense 3D reconstruction associated with a panoramic view of a surrounding scene using multiperspective panoramas according to the present invention.
Figure 17B:
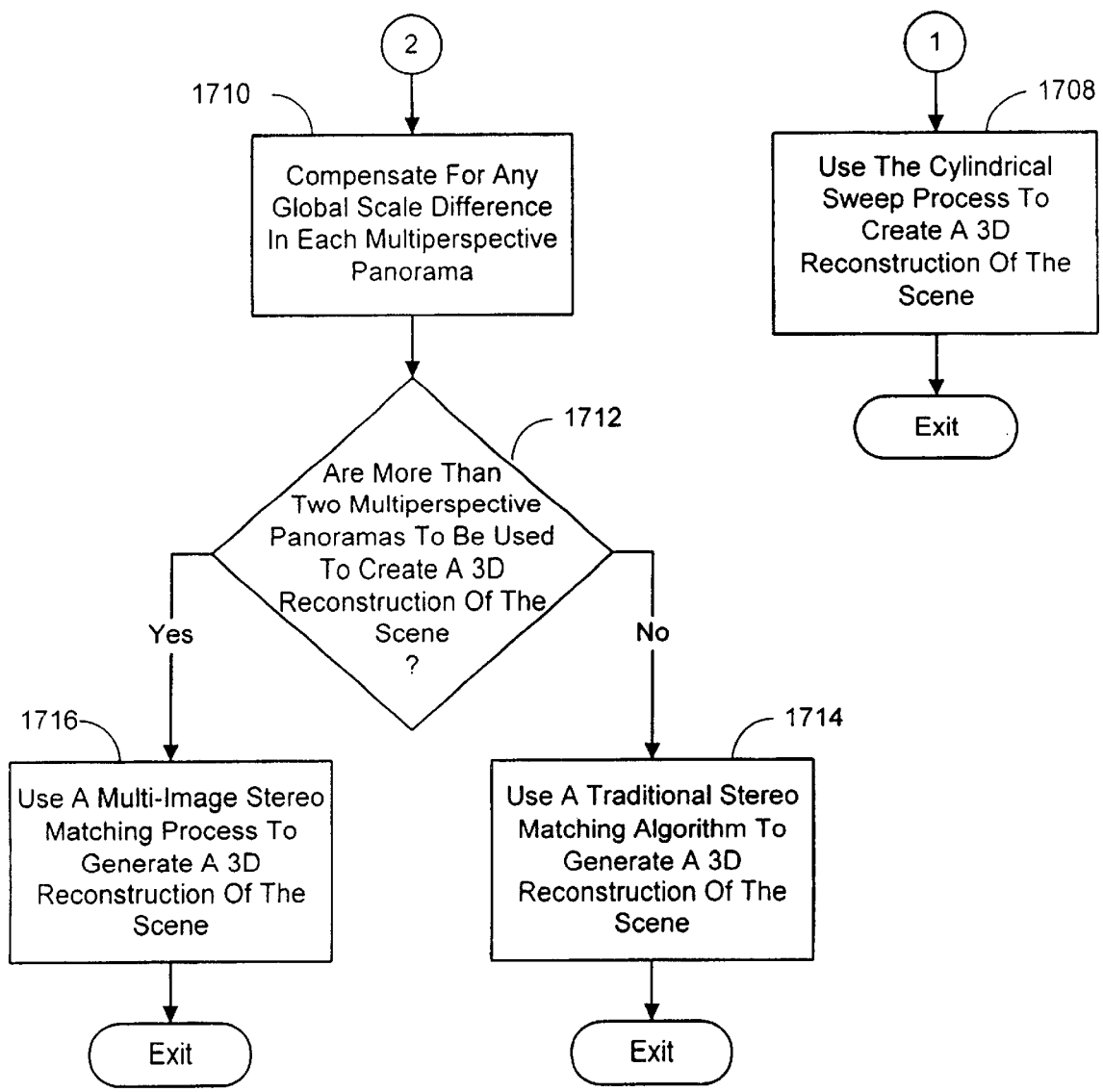

In view of the foregoing description, it can be stated that when the ratio R/r and/or off-axis angle $\phi$ are small, a nearly horizontal epipolar geometry (i.e., classic multi-baseline stereo geometry [12]) is obtained, after compensating once for the vertical scaling of each image. Thus, if these conditions exist, or if two symmetric multiperspective panoramas are being used, then traditional stereo matching algorithms can be employed for the stereo reconstruction process. Otherwise, the previously-described cylindrical sweeping process should be employed for this purpose. More specifically, referring to FIGS. 17A and 17B, the multiperspective panoramas are first constructed via any desired method (process action 1700). It is then decided if the stereo reconstruction process is to be conducted using just two symmetric multiperspective panoramas as indicated by process action 1702. If not, then in process action 1704, it is determined whether R/r is small (e.g., less than about 0.7) for each of the multiperspective panoramas being used. If this ratio is not small enough, then in process action 1706, it is determined whether the off-axis angle $\phi$ is small (e.g., less than about 15°) for each of the multiperspective panoramas being used. If the off-axis angle is not small enough, then in process action 1708, the cylindrical sweep process is used to create a 3D reconstruction of the scene.

If, however, a symmetric pair of multiperspective panoramas is to be employed, or R/r is small enough, or $\phi$ is small enough, then traditional stereo matching algorithms are employed for the reconstruction process. Specifically, any global scale difference (as described by equation (4)) is first compensated for in each multiperspective panorama (process action 1710). Then, as indicated by process action 1712, it is decided if more than two multiperspective panoramas are to be used create a 3D reconstruction of the scene from the panoramas. In the case where just two symmetric panoramas are being used, the answer is clearly no. However, in cases where more than two multiperspective panoramas have been constructed, the option exist to just employ two of them. However, it is preferred that as many of the panoramas as possible be used to generate the 3D reconstruction to improve its accuracy. Regardless, as indicated by process action 1714, if only two multiperspective panoramas are used, a traditional stereo matching algorithm designed for a pair of images is used to generate a 3D reconstruction of the scene. However, if more than two multiperspective panoramas are employed, then a so-called multi-image stereo matching process is used to create the desired reconstruction of the scene (process action 1716).

3.0 Experiments

It has been shown experimentally that good stereo reconstructions can be obtained from multiperspective panoramas, and that the original parallax in the scene can be recreated from just one panorama and one panoramic depth map. It is also possible to extrapolate novel views from original panoramas and the recovered depth map.

Specifically, we have applied our stereo reconstruction from multiperspective panoramas system and process to both synthetic data and real data. For example, as indicated previously, FIGS. 5(a) and (b) depict two synthesized concentric panoramas. In all we synthesized seven (7) such panoramas, each representing what a slit camera would have produced if rotated around circles of different radii (i.e., 0.4, 0.5, . . . 1.0). FIG. 5(a) represents the concentric panoramas associated with the outermost camera position (i.e., R=1.0) and FIG. 5(b) represents the concentric panorama associated with the middle camera position (i.e., R=0.7). FIG. 5(c) shows the estimated depth map associated with a panorama at the middle camera position, which was derived from the seven synthesized concentric panoramas. It should be noted that the concentric panoramas were synthesized using a relatively small specified horizontal field of view (i.e., 24°). Because of this small field of view, the panoramas exhibit negligible vertical parallax. Using the estimated depth map shown in FIG. 5(c), we synthesize the concentric panorama shown in 5(d) with the same camera parameters as in 5(a). The new panorama is almost indistinguishable from 5(a) except in the regions where significant occlusion occurs as shown in the close-up in 5(h). Notice that the spotlight is synthesized well even though its depth estimation is clearly wrong.

Figure 10A:
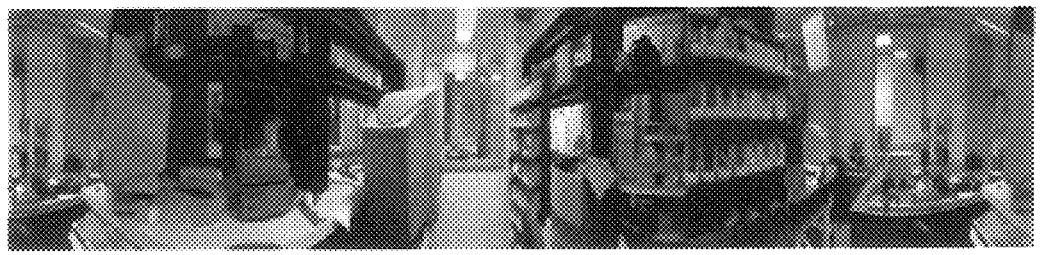
FIGS. 10(a) and 10(b) are images depicting swing panoramas derived from image columns associated with two different off-axis angles.
Figure 10B:
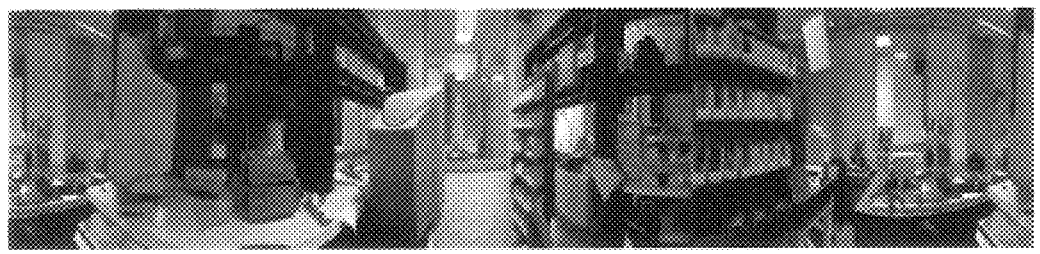
Figure 10D:
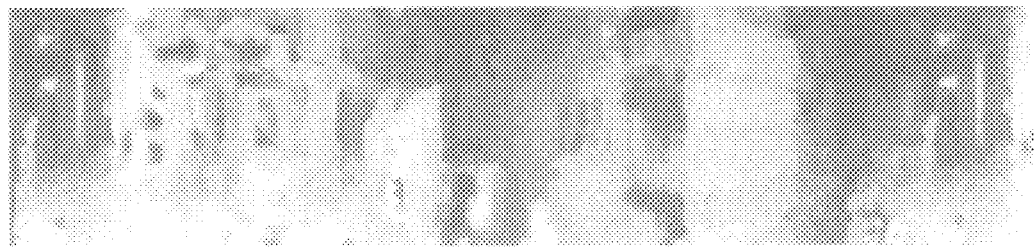
FIG. 10(d) is an image depicting a novel panorama extrapolated from the depth map of FIG. 10(c).
Figure 10D:
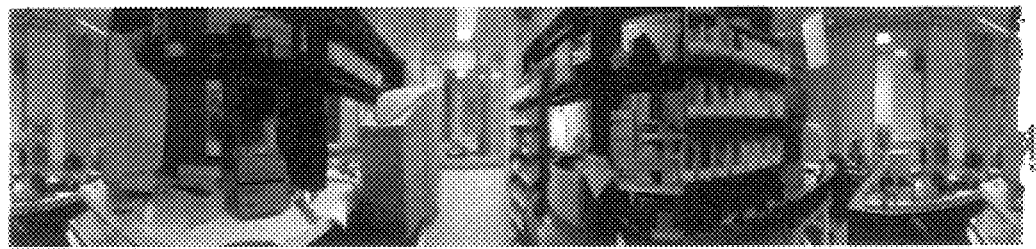
Figure 10E:
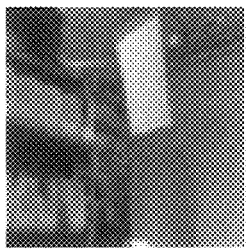
FIGS. 10(e) through 10(g) are images depicting close-up portions of FIGS. 10(a) and 10(b).
Figure 10F:
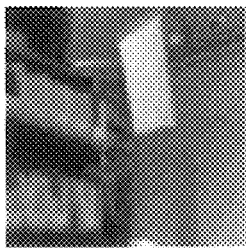
Figure 10G:
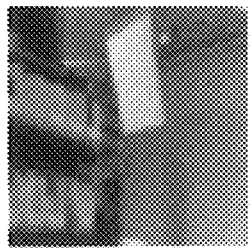
Figure 10H:
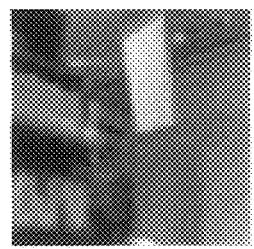
FIG. 10(h) is an image depicting a close-up portion of FIG. 10(d).

Referring now to FIGS. 10(a) and (b), two swing panoramas respectively created using the leftmost column and the center column from each single-perspective image captured during a real swing sequence of a lab scene. We used a digital video camera in portrait mode with a field of view of around 27° by 36° and a digitized image size of 240 by 320 pixels. The camera was mounted off-centered on a plate rotated with a step motor which provided accurate rotation parameters. After scaling the images vertically by $\cos\psi$, we found that there was a small 0.5 pixel drift remaining between the panoramas. This was probably caused by a slight rotation of the camera around its optical axis. In practice, compensating for such registration errors is not difficult: a simple point tracker followed by linear regression can be used to obtain the best possible horizontal epipolar geometry. The panoramas after vertical scaling and drift compensation are shown in the close-up regions in FIGS. 10(e) through 10(g). As you can see, very little vertical parallax remains. The reconstructed depth map generated from the swing panoramas formed from the single-perspective images of the lab scene is shown in FIG. 10(c), and a synthesized novel panorama (from an extrapolated viewpoint) and its close-up are shown in FIGS. 10(d) and 10(f), respectively.

4.0 Alternate Techniques

While the invention has been described in detail by specific reference to preferred embodiments thereof, it is understood that variations and modifications thereof may be made without departing from the true spirit and scope of the invention. For example, while it has been assumed that the cameras used to capture the single-perspective images employed to form the multiperspective panoramas in accordance with the present invention, are all moving in the same plane, there is actually nothing preventing the cameras from being located in different (parallel) planes [19], so long as their rotation axes are all the same (i.e., the camera motions are co-axial, rather than concentric). The only difference in this case is the addition of some extra depth-dependent vertical parallax, which can easily be accommodated in both traditional stereo algorithms and in the previously-described cylindrical sweep process using additional vertical scaling and shifting factors. Further, it is noted that a more general camera configuration can be used to create the swing panoramas according to the present invention where one or more cameras are angled at various orientations with respect to the swing arm and one or more columns are sampled from each camera. Finally, while the camera path used to capture the single-perspective images from which the multiperspective panoramas were derived have been described as being circular, this need not be the case. The path that the camera takes can be any continuous path around a center of rotation. However, if the multiperspective panorama is to be constructed in a manner similar to a concentric panorama, then each camera path should be identical but proportionally larger or smaller than an adjacent path. The process for generating the 3D reconstruction of the scene remains the same, regardless of the shape of the path. The use of non-circular paths may be advantageous under certain circumstances. For example, a non-circular path might be better suited to keeping the R/r ratio small at every rotational angle θ around the centroid of the path, thereby allowing the use of traditional stereo reconstruction algorithms.

REFERENCES

[1] S. Baker, R. Szeliski, and P. Anandan. A layered approach to stereo reconstruction. In *IEEE Computer Society Conference on Computer Vision and Pattern Recognition (CVPR'98)*, pages 434–441, Santa Barbara, June 1998.

[2] J. R. Bergen, P. Anandan, K. J. Hanna, and R. Hingorani. Hierarchical model-based motion estimation. In *Second European Conference on Computer Vision (ECCV'92)*, pages 237–252, Santa Margherita Liguere, Italy, May 1992. Springer-Verlag.

[3] R. T. Collins. A space-sweep approach to true multi-image matching. In *IEEE Computer Society Conference on Computer Vision and Pattern Recognition (CVPR'96)*, pages 358–363, San Francisco, Calif., June 1996.

[4] S. J. Gortler, R. Grzeszczuk, R. Szeliski, and M. F. Cohen. The lumigraph. In *Computer Graphics Proceedings, Annual Conference Series*, pages 43–54, Proc. SIGGRAPH'96 (New Orleans), August 1996. ACM SIGGRAPH.

[5] R. Gupta and R. I. Hartley. Linear pushbroom cameras. *IEEE Transactions on Pattern Analysis and Machine Intelligence*, 19 (9): 963–975, September 1997.

[6] T. Kanade et al. A stereo machine for video-rate dense depth mapping and its new applications. In *IEEE Computer Society Conference on Computer Vision and Pattern Recognition (CVPR'96)*, pages 96–202, San Francisco, Calif., June 1996.

[7] S. B. Kang and R Szeliski. 3-D scene data recovery using omni-directional multibaseline stereo. *International Journal of Computer Vision*, 25 (2): 167–183, November 1997.

[8] A. Krishnan and N. Ahuja. Range estimation from focus using a non-frontal imaging camera. *International Journal of Computer Vision*, 20 (3): 169–185, March/April 1996.

[9] K. N. Kutulakos and S. M. Seitz. A theory of shape by space carving. C S Technical Report 692, University of Rochester, Rochester, N.Y., May 1998.

[10] M. Levoy and P. Hanrahan. Light field rendering. In *Computer Graphics Proceedings, Annual Conference Series*, pages 31–42, Proc. SIGGRAPH'96 (New Orleans), August 1996. ACM SIG-GRAPH.

[11] L. McMillan and G. Bishop. Plenoptic modeling: An image-based rendering system. *Computer Graphics (SIGGRAPH'95)*, pages 39–46, August 1995.

[12] M. Okutomi and T. Kanade. A multiple baseline stereo. *IEEE Transactions on Pattern Analysis and Machine Intelligence*, 15 (4): 353–363, April 1993.

[13] R. Peleg and M. Ben-Ezra. Stereo panorama with a single camera. In *CVPR'99*, pages 395–401, Fort Collins, June 1999.

[14] S. Peleg and J. Herman. Panoramic mosaics by manifold projection. In *IEEE Computer Society Conference on Computer Vision and Pattern Recognition (CVPR'97)*, pages 338–343, San Juan, Puerto Rico, June 1997.

[15] L. H. Quam. Hierarchical warp stereo. In *Image Understanding Workshop*, pages 149–155, New Orleans, La., December 1984. Science Applications International Corporation.

[16] P. Rademacher and Bishop G. Multiple-center-of-projection images. In *Computer Graphics Proceedings, Annual Conference Series*, pages 199–206, Proc. SIGGRAPH'98 (Orlando), July 1998. ACMSIGGRAPH.

[17] D. Scharstein and R. Szeliski. Stereo matching with non-linear diffusion. *International Journal of Computer Vision*, 28 (2): 155–174, July 1998

[18] S. M. Seitz and C. M. Dyer. Photorealistic scene reconstrcution by space coloring. In *IEEE Computer Society Conference on Computer Vision and Pattern Recognition (CVPR'97)*, pages 1067–1073, San Juan, Puerto Rico, June 1997.

[19] H.-Y. Shum et al. Omnivergent stereo. In *Seventh International Conference on Computer Vision (ICCV'99)*, Greece, September 1999.

[20] H.-Y. Shum and L.-W. He. Rendering with concentric mosaics. In SIGGRAPH'99, Los Angeles, August 1997.

[21] R. Szeliski. A multi-view approach to motion and stereo. In *IEEE Comp. Soc. Conf. On Computer Vision and Pattern Recognition (CVPR'99)*, pages 157–163, Fort Collins, June 1999.

[22] R. Szeliski and P. Golland. Stereo matching with transparency and matting. In *Sixth International Conference on Computer Vision (ICCV'98)*, pages 517–524, Bombay, January 1998.

[23] R. Szeliski and H.-Y. Shum. Creating full view panoramic image mosaics and texture-mapped models. *Computer Graphics (SIGGRAPH'97)*, pages 251–258, August 1997.

[24] D. N. Wood et al. Multiperspective panoramas for cel animation. In *Computer Graphics Proceedings, Annual Conference Series*, pages 243–250, Proc. SIGGRAPH'97 (Los Angeles), August 1997. ACM SIGGRAPH.

Wherefore, what is claimed is:

1. A computer-implemented process for computing a 3D reconstruction of a scene, comprising using a computer to perform the following process actions:

constructing at least two multiperspective panoramas from a collection of single-perspective images of the scene each of which was captured from a different, but co-axial, viewpoint, wherein each multiperspective panorama comprises a plurality of side-by-side columnar images depicting consecutive portions of the scene each of which was obtained from a different one of the single-perspective images; and computing the 3D reconstruction of the scene from the at least two multiperspective panoramas.

2. The process of claim 1, wherein the process action of constructing at least two multiperspective panoramas comprises an act of, for each multiperspective panorama, using columnar images obtained from single-perspective images whose viewpoints are all at the same fixed radius from a center of rotation and which are all laterally centered about a line forming a particular off-axis angle with respect to a swing line, said swing line being defined by the center of rotation and the viewpoint associated with each single-perspective images from which the respective columnar images were obtained.

3. The process of claim 2, wherein the off-axis angle is 90 degrees for each columnar image, and the magnitude of the fixed radius is different for each multiperspective panorama.

4. The process of claim 2, wherein the fixed radius is the same for each multiperspective panorama and the off-axis angle is different for each multiperspective panorama.

5. The process of claim 2, wherein the viewpoints associated with all the columnar images are co-planar.

6. The process of claim 1, wherein the process action of computing a 3D reconstruction of the scene comprises the acts of:

projecting each pixel of each multiperspective panorama being used to compute the 3D reconstruction onto each of a series of cylindrical surfaces of progressively increasing radii, all of which exceed the radius of the outermost multiperspective panorama employed;

for each pixel location on each cylindrical surface, computing a fitness metric for all the pixels projected from each multiperspective panorama onto the pixel location, wherein said fitness metric provides an indication as to how closely a prescribed characteristic of said projected pixels match each other;

for each respective group of corresponding pixel locations of the cylindrical surfaces, determining which particular location of the group has a computed fitness metric that indicates the prescribed characteristic of said projected pixels matches more closely than the rest (hereinafter referred to as the winning pixel location), wherein a group of corresponding pixel locations of the cylindrical surfaces are those which depict the same portion of the scene; and for each winning pixel location, identifying its panoramic coordinates and designating these coordinates to be the position of the portion of the scene depicted by the pixels projected from the multiperspective panoramas to that location.

7. The process of claim 6, wherein the process action of determining the winning pixel location comprises an act of employing a correlation-based stereo depth technique to identify which particular location of each group of corresponding pixel locations of the cylindrical surfaces has a computed fitness metric that indicates the prescribed characteristic of said projected pixels matches more closely than the rest.

8. The process of claim 6, wherein the process action of determining the winning pixel location comprises an act of employing a global optimization stereo depth technique to identify which particular location of each group of corresponding pixel locations of the cylindrical surfaces has a computed fitness metric that indicates the prescribed characteristic of said projected pixels matches more closely than the rest.

9. The process of claim 6, wherein the process action of computing a 3D reconstruction of the scene further comprises the act of spatially aggregating the computed fitness metric at each pixel location on each cylindrical surface, prior to performing the process action of determining the winning pixel location for each respective group of corresponding pixel locations of the cylindrical surfaces.

10. The process of claim 1, wherein the process action of constructing at least two multiperspective panoramas comprises an act of constructing a pair of symmetric multiperspective panoramas, wherein two multiperspective panoramas are symmetric whenever, the columnar images used to construct each panorama are all obtained from single perspective images whose viewpoints are at the same radius from a common center of rotation, the columnar images used to construct the first panorama of the pair are all centered about a first line forming an off-axis angle in the clockwise direction with respect to a swing line, said swing line being defined by the common center of rotation and the viewpoint associated with each single-perspective images from which the respective columnar images were obtained, and the columnar images used to construct the second panorama of the pair are all centered about a second line forming the same off-axis angle with respect to the swing line but in the counterclockwise direction.

11. The process of claim 10, wherein the process action of computing a 3D reconstruction of the scene comprises the acts of:

employing the pair of symmetric multiperspective panoramas;

compensating for any global vertical scale difference in each multiperspective panorama; and using any traditional stereo matching algorithm requiring a horizontal epipolar geometry to designate the coordinates of the portion of the scene depicted by each corresponding pixel location of the multiperspective panoramas.

12. The process of claim 1, wherein the process action of constructing at least two multiperspective panoramas comprises an act of constructing each multiperspective panorama using columnar images obtained from single perspective images whose viewpoints are all at the same radius from a center of rotation, and wherein said radius is less than approximately 0.7 the distance from the center of rotation and the nearest point in the scene depicted in any of the columnar images.

13. The process of claim 12, wherein the process action of computing a 3D reconstruction of the scene comprises the acts of:

compensating for any global vertical scale difference in each multiperspective panorama; and using any traditional stereo matching algorithm requiring a horizontal epipolar geometry to designate the coordinates of the portion of the scene depicted by each corresponding pixel location of the multiperspective panoramas.

14. The process of claim 13, wherein there are more than two multiperspective panoramas used to compute the 3D reconstruction of the scene, and wherein the traditional stereo matching algorithm is a multi-image stereo matching process.

15. The process of claim 1, wherein the process action of constructing at least two multiperspective panoramas comprises an act of constructing each multiperspective panorama using columnar images obtained from single perspective images whose viewpoints are all at the same fixed radius from a center of rotation and which are all laterally centered about a line forming an off-axis angle with respect to a swing line, said swing line being defined by the center of rotation and the viewpoint associated with each single-perspective images from which the respective columnar images were obtained, and wherein the off-axis angle does not exceed approximately 15 degrees.

16. The process of claim 15, wherein the process action of computing a 3D reconstruction of the scene comprises the acts of:
compensating for any global vertical scale difference in each multiperspective panorama; and
using any traditional stereo matching algorithm requiring a horizontal epipolar geometry to designate the coordinates of the portion of the scene depicted by each corresponding pixel location of the multiperspective panoramas.

17. The process of claim 16, wherein there are more than two multiperspective panoramas used to compute the 3D reconstruction of the scene, and wherein the traditional stereo matching algorithm is a multi-image stereo matching process.

18. The process of claim 1, further comprising the act of creating a depth map of the scene from the computed 3D reconstruction.

19. A system for computing a 3D reconstruction of a scene, comprising:
a general purpose computing device;
a computer program comprising program modules executable by the computing device, wherein the computing device is directed by the program modules of the computer program to,
construct at least two multiperspective panoramas from a collection of single-perspective images of the scene each of which was captured from a different, but co-axial, viewpoint, wherein each multiperspective panorama comprises a plurality of side-by-side columnar images depicting consecutive portions of the scene each of which was obtained from a different one of the single-perspective images, and
compute the 3D reconstruction of the scene from the at least two multiperspective panoramas.

20. The system of claim 19, wherein the program module for constructing at least two multiperspective panoramas comprises a sub-module for employing at least one camera to capture the single-perspective images of the scene, said camera's motion being constrained to a radial path around a fixed rotation center, and wherein each single-perspective image is captured at one of a series of consecutive rotation angles around the center of rotation.

21. The system of claim 20, wherein the camera is a slit image camera, and wherein each columnar image is a slit image of the scene captured by said camera.

22. The system of claim 21, wherein said slit image is a one pixel wide column.

23. The system of claim 20, wherein the camera is a perspective view camera, and wherein each columnar image comprises a portion of the image captured by the camera.

24. The system of claim 23, wherein said portion of the image captured by the camera is a one pixel wide column.

25. The system of claim 19, wherein the program module for constructing at least two multiperspective panoramas comprises a sub-module for extracting the single-perspective images from a synthesizes scene, wherein each extracted image depicts a part of the synthesized scene that a camera would capture if its motion were constrained to a radial path around a fixed rotation center and each image was captured at one of a series of consecutive rotation angles around the center of rotation.

26. The system of claim 25, wherein images extracted are one-pixel wide.

27. The system of claim 19, wherein the program module for constructing at least two multiperspective panoramas comprises, for each multiperspective panorama, using columnar images obtained from single-perspective images whose viewpoints are all at the same fixed radius from a center of rotation and which are all laterally centered about a line forming a particular off-axis angle with respect to a swing line, said swing line being defined by the center of rotation and the viewpoint associated with each single-perspective images from which the respective columnar images were obtained.

28. The system of claim 27, wherein the off-axis angle is 90 degrees for each columnar image, and the magnitude of the fixed radius is different for each multiperspective panorama.

29. The system of claim 27, wherein the fixed radius is the same for each multiperspective panorama and the off-axis angle is different for each multiperspective panorama.

30. The system of claim 27, wherein the viewpoints associated with all the columnar images are co-planar.

31. The system of claim 19, wherein the program module for computing a 3D reconstruction of the scene comprises sub-modules for:
projecting each pixel of each multiperspective panorama being used to compute the 3D reconstruction onto each of a series of cylindrical surfaces of progressively increasing radii, all of which exceed the radius of the outermost multiperspective panorama employed;
for each pixel location on each cylindrical surface, computing a fitness metric for all the pixels projected from each multiperspective panorama onto the pixel location, wherein said fitness metric provides an indication as to how closely a prescribed characteristic of said projected pixels match each other;
for each respective group of corresponding pixel locations of the cylindrical surfaces, determining which particular location of the group has a computed fitness metric that indicates the prescribed characteristic of said projected pixels matches more closely than the rest (hereinafter referred to as the winning pixel location), wherein a group of corresponding pixel locations of the cylindrical surfaces are those which depict the same portion of the scene; and
for each winning pixel location, identifying its panoramic coordinates and designating these coordinates to be the position of the portion of the scene depicted by the pixels projected from the multiperspective panoramas to that location.

32. The system of claim 31, wherein the sub-module for determining the winning pixel location comprises a sub-module for employing a correlation-based stereo depth technique to identify which particular location of each group of corresponding pixel locations of the cylindrical surfaces has a computed fitness metric that indicates the prescribed characteristic of said projected pixels matches more closely than the rest.

33. The system of claim 31, wherein the sub-module for determining the winning pixel location comprises a sub-module for employing a global optimization stereo depth technique to identify which particular location of each group of corresponding pixel locations of the cylindrical surfaces has a computed fitness metric that indicates the prescribed characteristic of said projected pixels matches more closely than the rest.

34. The system of claim 31, wherein the program module for computing a 3D reconstruction of the scene further comprises a sub-module for spatially aggregating the computed fitness metric at each pixel location on each cylindrical surface, prior to performing the process action of determining the winning pixel location for each respective group of corresponding pixel locations of the cylindrical surfaces.

35. The system of claim 19, wherein the program module for constructing at least two multiperspective panoramas comprises a sub-module for constructing a pair of symmetric multiperspective panoramas, wherein two multiperspective panoramas are symmetric whenever, the columnar images used to construct each panorama are all obtained from single perspective images whose viewpoints are at the same radius from a common center of rotation, the columnar images used to construct the first panorama of the pair are all centered about a first line forming an off-axis angle in the clockwise direction with respect to a swing line, said swing line being defined by the common center of rotation and the viewpoint associated with each single-perspective images from which the respective columnar images were obtained, and the columnar images used to construct the second panorama of the pair are all centered about a second line forming the same off-axis angle with respect to the swing line but in the counterclockwise direction.

36. The system of claim 35, wherein the program module for computing a 3D reconstruction of the scene comprises sub-modules for:

employing the pair of symmetric multiperspective panoramas;

compensating for any global vertical scale difference in each multiperspective panorama; and using any traditional stereo matching algorithm requiring a horizontal epipolar geometry to designate the coordinates of the portion of the scene depicted by each corresponding pixel location of the multiperspective panoramas.

37. The system of claim 19, wherein the program module for constructing at least two multiperspective panoramas comprises a sub-module for constructing each multiperspective panorama using columnar images obtained from single perspective images whose viewpoints are all at the same radius from a center of rotation, and wherein said radius is less than approximately 0.7 of the distance from the center of rotation and the nearest point in the scene depicted in any of the columnar images.

38. The system of claim 37, wherein the program module for computing a 3D reconstruction of the scene comprises sub-modules for:

compensating for any global vertical scale difference in each multiperspective panorama; and using any traditional stereo matching algorithm requiring a horizontal epipolar geometry to designate the coordinates of the portion of the scene depicted by each corresponding pixel location of the multiperspective panoramas.

39. The system of claim 38, wherein there are more than two multiperspective panoramas used to compute the 3D reconstruction of the scene, and wherein the traditional stereo matching algorithm is a multi-image stereo matching process.

40. The system of claim 19, wherein the program module for constructing at least two multiperspective panoramas comprises a sub-module for constructing each multiperspective panorama using columnar images obtained from single perspective images whose viewpoints are all at the same fixed radius from a center of rotation and which are all laterally centered about a line forming an off-axis angle with respect to a swing line, said swing line being defined by the center of rotation and the viewpoint associated with each single-perspective images from which the respective columnar images were obtained, and wherein the off-axis angle does not exceed approximately 15 degrees.

41. The system of claim 40, wherein the program module for computing a 3D reconstruction of the scene comprises sub-modules for:

compensating for any global vertical scale difference in each multiperspective panorama; and using any traditional stereo matching algorithm requiring a horizontal epipolar geometry to designate the coordinates of the portion of the scene depicted by each corresponding pixel location of the multiperspective panoramas.

42. The system of claim 41, wherein there are more than two multiperspective panoramas used to compute the 3D reconstruction of the scene, and wherein the traditional stereo matching algorithm is a multi-image stereo matching process.

43. The system of claim 19, further comprising a program module for creating a depth map of the scene from the computed 3D reconstruction.

44. A computer-readable memory for computing a 3D reconstruction of a scene, comprising:

a computer-readable storage medium; and a computer program comprising program modules stored in the storage medium, wherein the storage medium is so configured by the computer program that it causes a computer to, construct at least two multiperspective panoramas from a collection of single-perspective images of the scene each of which was captured from a different, but co-axial, viewpoint, wherein each multiperspective panorama comprises a plurality of side-by-side columnar images depicting consecutive portions of the scene each of which was obtained from a different one of the single-perspective images, and compute the 3D reconstruction of the scene from the at least two multiperspective panoramas.

45. The computer-readable memory of claim 44, wherein the program module for constructing at least two multiperspective panoramas comprises, for each multiperspective panorama, using columnar images obtained from single-perspective images whose viewpoints are all at the same fixed radius from a center of rotation and which are all laterally centered about a line forming a particular off-axis angle with respect to a swing line, said swing line being defined by the center of rotation and the viewpoint associated with each single-perspective images from which the respective columnar images were obtained.

46. The computer-readable memory of claim 45, wherein the off-axis angle is 90 degrees for each columnar image, and the magnitude of the fixed radius is different for each multiperspective panorama.

47. The computer-readable memory of claim 45, wherein the fixed radius is the same for each multiperspective panorama and the off-axis angle is different for each multiperspective panorama.

48. The computer-readable memory of claim 45, wherein the viewpoints associated with all the columnar images are co-planar.

49. The computer-readable memory of claim 44, wherein the program module for computing a 3D reconstruction of the scene comprises sub-modules for:
  projecting each pixel of each multiperspective panorama being used to compute the 3D reconstruction onto each of a series of cylindrical surfaces of progressively increasing radii, all of which exceed the radius of the outermost multiperspective panorama employed;
  for each pixel location on each cylindrical surface, computing a fitness metric for all the pixels projected from each multiperspective panorama onto the pixel location, wherein said fitness metric provides an indication as to how closely a prescribed characteristic of said projected pixels match each other;
  for each respective group of corresponding pixel locations of the cylindrical surfaces, determining which particular location of the group has a computed fitness metric that indicates the prescribed characteristic of said projected pixels matches more closely than the rest (hereinafter referred to as the winning pixel location), wherein a group of corresponding pixel locations of the cylindrical surfaces are those which depict the same portion of the scene; and
  for each winning pixel location, identifying its panoramic coordinates and designating these coordinates to be the position of the portion of the scene depicted by the pixels projected from the multiperspective panoramas to that location.

50. The computer-readable memory of claim 49, wherein the sub-module for determining the winning pixel location comprises a sub-module for employing a correlation-based stereo depth technique to identify which particular location of each group of corresponding pixel locations of the cylindrical surfaces has a computed fitness metric that indicates the prescribed characteristic of said projected pixels matches more closely than the rest.

51. The computer-readable memory of claim 49, wherein the sub-module for determining the winning pixel location comprises a sub-module for employing a global optimization stereo depth technique to identify which particular location of each group of corresponding pixel locations of the cylindrical surfaces has a computed fitness metric that indicates the prescribed characteristic of said projected pixels matches more closely than the rest.

52. The computer-readable memory of claim 49, wherein the program module for computing a 3D reconstruction of the scene further comprises a sub-module for spatially aggregating the computed fitness metric at each pixel location on each cylindrical surface, prior to performing the process action of determining the winning pixel location for each respective group of corresponding pixel locations of the cylindrical surfaces.

53. The computer-readable memory of claim 44, wherein the program module for constructing at least two multiperspective panoramas comprises a sub-module for constructing a pair of symmetric multiperspective panoramas, wherein two multiperspective panoramas are symmetric whenever,
  the columnar images used to construct each panorama are all obtained from single perspective images whose viewpoints are at the same radius from a common center of rotation,
  the columnar images used to construct the first panorama of the pair are all centered about a first line forming an off-axis angle in the clockwise direction with respect to a swing line, said swing line being defined by the common center of rotation and the viewpoint associated with each single-perspective images from which the respective columnar images were obtained, and
  the columnar images used to construct the second panorama of the pair are all centered about a second line forming the same off-axis angle with respect to the swing line but in the counterclockwise direction.

54. The computer-readable memory of claim 53, wherein the program module for computing a 3D reconstruction of the scene comprises sub-modules for:
  employing the pair of symmetric multiperspective panoramas;
  compensating for any global vertical scale difference in each multiperspective panorama; and
  using any traditional stereo matching algorithm requiring a horizontal epipolar geometry to designate the coordinates of the portion of the scene depicted by each corresponding pixel location of the multiperspective panoramas.

55. The computer-readable memory of claim 44, wherein the program module for constructing at least two multiperspective panoramas comprises a sub-module for constructing each multiperspective panorama using columnar images obtained from single perspective images whose viewpoints are all at the same radius from a center of rotation, and wherein said radius is less than approximately 0.7 of the distance from the center of rotation and the nearest point in the scene depicted in any of the columnar images.

56. The computer-readable memory of claim 55, wherein the program module for computing a 3D reconstruction of the scene comprises sub-modules for:
  compensating for any global vertical scale difference in each multiperspective panorama; and
  using any traditional stereo matching algorithm requiring a horizontal epipolar geometry to designate the coordinates of the portion of the scene depicted by each corresponding pixel location of the multiperspective panoramas.

57. The computer-readable memory of claim 56, wherein there are more than two multiperspective panoramas used to compute the 3D reconstruction of the scene, and wherein the traditional stereo matching algorithm is a multi-image stereo matching process.

58. The computer-readable memory of claim 44, wherein the program module for constructing at least two multiperspective panoramas comprises a sub-module for constructing each multiperspective panorama using columnar images obtained from single perspective images whose viewpoints are all at the same fixed radius from a center of rotation and which are all laterally centered about a line forming an off-axis angle with respect to a swing line, said swing line being defined by the center of rotation and the viewpoint associated with each single-perspective images from which the respective columnar images were obtained, and wherein the off-axis angle does not exceed approximately 15 degrees.

59. The computer-readable memory of claim 58, wherein the program module for computing a 3D reconstruction of the scene comprises sub-modules for:

compensating for any global vertical scale difference in each multiperspective panorama; and using any traditional stereo matching algorithm requiring a horizontal epipolar geometry to designate the coordinates of the portion of the scene depicted by each corresponding pixel location of the multiperspective panoramas.

60. The computer-readable memory of claim 59, wherein there are more than two multiperspective panoramas used to compute the 3D reconstruction of the scene, and wherein the traditional stereo matching algorithm is a multi-image stereo matching process.

61. The computer-readable memory of claim 44, further comprising a program module for creating a depth map of the scene from the computed 3D reconstruction.

* * * * *